US005537490A

United States Patent [19]

Yukawa

[11] Patent Number: 5,537,490

[45] Date of Patent: Jul. 16, 1996

[54] LINE IMAGE PROCESSING METHOD

[75] Inventor: Noriaki Yukawa, Nara-ken, Japan

[73] Assignee: Matsushita Electric Industrial Co., Ltd., Osaka-fu, Japan

[21] Appl. No.: 111,044

[22] Filed: Aug. 24, 1993

Related U.S. Application Data

[63] Continuation-in-part of Ser. No. 70,790, Jun. 3, 1993, abandoned.

[30] Foreign Application Priority Data

Jun. 4, 1992 [JP] Japan .................................... 4-144400

[51] Int. Cl.$^6$ ........................................................ G06K 9/30

[52] U.S. Cl. .......................... 382/197; 382/266; 382/316

[58] Field of Search .................................. 382/60, 22, 8, 382/25, 55, 21, 54, 316, 266, 197, 199; 364/552, 469, 413.22

[56] References Cited

U.S. PATENT DOCUMENTS

| | | | |
|---|---|---|---|
| 3,671,936 | 6/1972 | Takahashi et al. | 340/146.3 |
| 3,671,937 | 6/1972 | Takahashi et al. | 382/60 |
| 3,671,941 | 6/1972 | Takahashi et al. | 382/60 |
| 3,717,847 | 2/1973 | Kakuta | 340/146.3 |
| 4,368,462 | 1/1983 | Crawley | 382/54 |
| 4,466,123 | 8/1984 | Arai et al. | 382/55 |
| 4,519,041 | 5/1985 | Fant et al. | 364/552 |
| 4,855,933 | 8/1989 | Kondo | 382/55 |
| 4,922,332 | 5/1990 | Taniguchi et al. | 382/55 |
| 5,065,439 | 11/1991 | Takasaki et al. | 382/25 |
| 5,157,735 | 10/1992 | Maeda et al. | 382/8 |
| 5,197,108 | 3/1993 | Watanabe | 382/47 |
| 5,204,918 | 4/1993 | Hirosawa | 382/22 |
| 5,218,542 | 6/1993 | Endo et al. | 364/424.05 |
| 5,251,268 | 10/1993 | Colley et al. | 382/15 |
| 5,339,365 | 8/1994 | Kawai et al. | 382/22 |

*Primary Examiner*—Joseph Mancuso
*Assistant Examiner*—Jon Chang
*Attorney, Agent, or Firm*—Wenderoth, Lind & Ponack

[57] ABSTRACT

A line image processing method for processing an image in which the following line or lines defectively and dispersedly exist in a line image to be shaped: a line which is connected to a line which should be disconnected therefrom to make a long line or make a branch line, lines which should connected to each other and which are separated from each other, a line which is connected to an unnecessary short line, or a line which has a short line connected thereto indicating noise, includes the steps of picking up a line image to be processed by an image pick-up device, scanning the line image to retrieve a line to be traced, tracing an arrangement direction of each pixel composing the retrieved line by means of a direction code, tracing the retrieved and traced line to an end point thereof by selecting at a branch point a direction closer to an average value of a plurality of various direction codes preceding the branch point when the branch point is detected, erasing an image of a cluster corresponding to the line traced to the end point thereof from the line image to be processed, transferring image data of the cluster to a different processed line image, tracing all lines by repeating the above steps, erasing the image data of the cluster from the line image to be processed, and transferring the generated image data of the cluster to the processed line image.

7 Claims, 23 Drawing Sheets

LINE IMAGE PROCESSING METHOD

CROSS-REFERENCE TO RELATED APPLICATIONS

This application is a Continuation-In-Part application of U.S. patent application Ser. No. 08/070,790, filed Jun. 3, 1993, entitled "LINE IMAGE-SHAPING METHOD" now abandoned.

BACKGROUND OF THE INVENTION

The present invention relates to a method of inspecting and/or measuring by picking up the image of an electronic component and processing the image thereof/and more particularly, a line image processing method for inspecting and/or measuring a line image.

In recent years, inspecting and/or measuring methods to which are carried out by the combination of an image pickup apparatus and an image processing apparatus have been popularly used in the field of inspecting and/or measuring industrial products. Of the methods, there have been progress in techniques for inspecting and/or measuring an industrial product by generating a binary image from a gray image thereof, thinning the binary image to form a line image based on the binary image, and then processing the line image. A line image processing method is known as an image-processing algorithm adapted for inspecting and/or measuring industrial products by means of the line image.

In the line image processing method, inspection and/or measurement is carried out by detecting and classifying the configuration of each line of a binary image in which the thickness of the line corresponds to one pixel.

Before the line image processing method is carried out, as shown in FIG. 21, the gray image is binarized to obtain the binary image and then the binary image is thinned to generate the line image. According to the line image processing method, the configuration of each line of the binarized line image is inspected and classified to inspect/measure industrial products.

With reference to FIGS. 22 through 37, a description is made on an example of a conventional line image processing method entitled "IMAGE PROCESSING OF THE PORTRAIT-DRAWING ROBOT (II) (LINE DESCRIPTION)" presented by Hiraishi, Shitanda, and Nakajima at the 1985 National Convention 1256 of Electronic Communication Society.

FIG. 22 is a flowchart showing the conventional line image processing method. In a branch vector-generating process executed at step #11, pixels constituting a line image are addressed as shown in FIG. 26 by using branch vectors shown in FIGS. 24 and 25. Then, the program goes to step #12. The directions of the pixels are shown in FIG. 23. FIGS. 24 and 25 show an example of branch vectors corresponding to the orientations of pixels adjacent to each other.

In a short line-removing process executed at step #12, short lines (shown by 1 of FIG. 27 and by the arrows of FIG. 28) branching from long lines and noise-like short lines (shown by the arrows of FIG. 28) not branching from the long lines are removed. Then, the program goes to step #13. FIG. 28 shows lines of the line image in which the short lines have not been removed from the long lines. FIG. 29 shows lines of the line image in which the short lines have been removed from the long lines.

In a line-connecting process executed at step #13, two lines or more each discontinuous due to the lack of one pixel are connected to each other and then, the program goes to step #14. In this process, the center of each of the patterns to be connected to each other are set at a one pixel-inexistent position as shown in FIG. 30. This connecting method is incapable of connecting lines to each other if they are distant from each other by two pixels or more.

In a branch line-cutting process executed at step #14, a point from which three lines branch and a point from which four lines branch are converted into a point from which one line branches and a point from which two lines branch. Then, the program goes to step #15. FIG. 31 shows a point 2 from which one line branches, a point 3 from which two lines branch, a point 4 from which three lines branch, and a point 5 from which four lines branch. The conversion is made as follows as shown in FIG. 32: Two straight lines each having lengths of L and 2L extend from a branch point and the elevation angle of each branch point is θ to make pairs of the straight lines in different directions. The direction of the straight line having the length of L is different from that of the straight line having the length of 2L. An equation 6 shown in FIG. 6 is used to decide the linearity of each pair of the straight lines by examining the linearities of the straight line having the length of L and the straight line having the length of 2L. Straight lines are separated from a branch point except a straight line having the highest degree of linearity. Lines shorter than a predetermined length which are separated from the image are erased. FIG. 33 shows branch points before and after lines are separated from the branch point. FIG. 34 shows a line image before lines are separated from the branch point. FIG. 35 shows a line image after lines are separated from the branch point.

In a line-tracing process executed at step #15, lines of the line image in which branch lines have been cut at step #14 are traced. Lines are traced as shown in FIG. 37 by means of a direction code shown in FIG. 36. The mark ∇ of FIG. 37 indicates points to be traced. Processing for shaping a line image is executed as described above and lines are classified (hereinafter referred to as clustering).

The conventional construction has, however, a disadvantage in that in the process of generating branch vectors, if there is a large number of branch vectors, it is necessary to perform complicated processing and a large number of processings. In addition, in the line-connecting process of step #13, lines can be connected to each other only when one pixel does not exist between the end points of lines to be connected to each other. That is, lines cannot be connected to each other when two pixels or more do not exist between the end points of the lines to be connected to each other. Further, in the branch line-cutting process executed at step #14, a branch condition is determined locally, not entirely, in the line image. As a result, misjudgments may be made. Due to these disadvantages, in carrying out clustering of each line of a line image to be processed such as a line connected to an unnecessary line to make a long line or a branch line, or discontinuous lines which are the connected to each other, the conventional line image-processing method is incapable of processing the line image with the required accuracy and reliability.

SUMMARY OF THE INVENTION

It is an object of the present invention to provide a line image processing method with a high accuracy, high speed, and high reliability even though the following line or lines defectively and dispersedly exist in a line image to be shaped: a line which is connected to a line which should be disconnected therefrom to make a long line or make a branch line, lines which are to be connected to each other and which are separated from each other, a line which is connected to an unnecessary short line, or a line which has a short line indicating noise.

In accomplishing this and other objects of the present invention, there is provided a line image processing method for processing an image in which the following line or lines defectively and dispersedly exist in a line image to be shaped: a line which is connected to a line which should be disconnected therefrom to make a long line or make a branch line, lines which should be connected to each other and which are separated from each other, a line which is connected to an unnecessary short line, or a line connected thereto which has a short line indicating noise, comprising the steps of: picking up a line image to be processed by an image pick-up device; scanning the line image to retrieve a line to be traced; tracing an arrangement direction of each pixel composing the retrieved line by means of a direction code; tracing the line retrieved from traced to an end point thereof by selecting at a branch point a direction closer to an average value of a plurality of various direction codes disposed preceding to the branch point when the branch point is detected; erasing an image of a cluster corresponding to the line traced to the end point thereof from the line image to be processed; transferring image data of the cluster to a different shaped line image; tracing all lines by repeating the above steps; erasing the image data of the cluster from the line image to be shaped; and transferring the generated image data of the cluster to the shaped line image.

According to the method of the first aspect of the present invention, the use of a branch vector is not required, whereas a branch vector is required in the conventional method. Moreover, only the execution of cluster-tracing step suffices for shaping a line image, whereas two processes of branch line-cutting and line-tracing are required in the conventional method. Therefore, according to the method of the first aspect of the present invention, the image can be processed with ease and a high speed. In addition, the image data of an obtained cluster is transferred to the different shaped line image to complete the processing of the line image. Thus, it is possible to process the line image with high accuracy and reliability. Furthermore, all lines composing the processed line image can be easily inspected and measured because they have image data.

In the method of the first aspect of the present invention, when the cluster to be transferred to the processed line image is longer than the predetermined length, an unnecessary line may be eliminated and thus processing for the line image may be easily executed.

In the method of the first aspect of the present invention, when the cluster shorter than the predetermined length is erased from the processed line image which has been completed, an unnecessary line may be eliminated and thus processing for the line image may be easily executed.

According to a second aspect of the present invention, there is provided a line image processing method for processing an image in which lines which are to be connected to each other are discontinuous, comprising the steps of: scanning the image so as to retrieve two lines, end points of which are close and opposed to each other; calculating coordinate data to evaluate coincidence degrees of a position, direction, and a configuration in the vicinity of the end points of the retrieved two lines; connecting the two lines to each other if the data obtained by the calculation is within a predetermined range; and repeating the above steps to connect all lines required to be connected.

According to the method of the second aspect of the present invention, in processing an image comprising defective discontinuous lines which are to be connected to each other, the two lines may be connected to each other even though a plurality of pixels exists in the interval between the end points thereof with high reliability and accuracy in inspection and measurement, although they are connected to each other only when one pixel exists in the interval between the end points thereof in the conventional method.

When the method of the first aspect of the present invention is executed and then the method of the second aspect thereof is executed, the combined method has the operations of both the first and second aspects of the present invention. In shaping a line image in which the following line or lines defectively and dispersedly exist in the line image to be processed: a line which is connected to a line which should be disconnected therefrom to make a long line or make a branch line, lines which should be connected to each other and which are separated from each other, a line which is connected to an unnecessary short line, or a line which has a short line attached thereto indicating noise, it is possible to process a line image with high speed, high accuracy, and high reliability. Furthermore, all lines composing the processed line image may be easily inspected and measured because they have image data.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
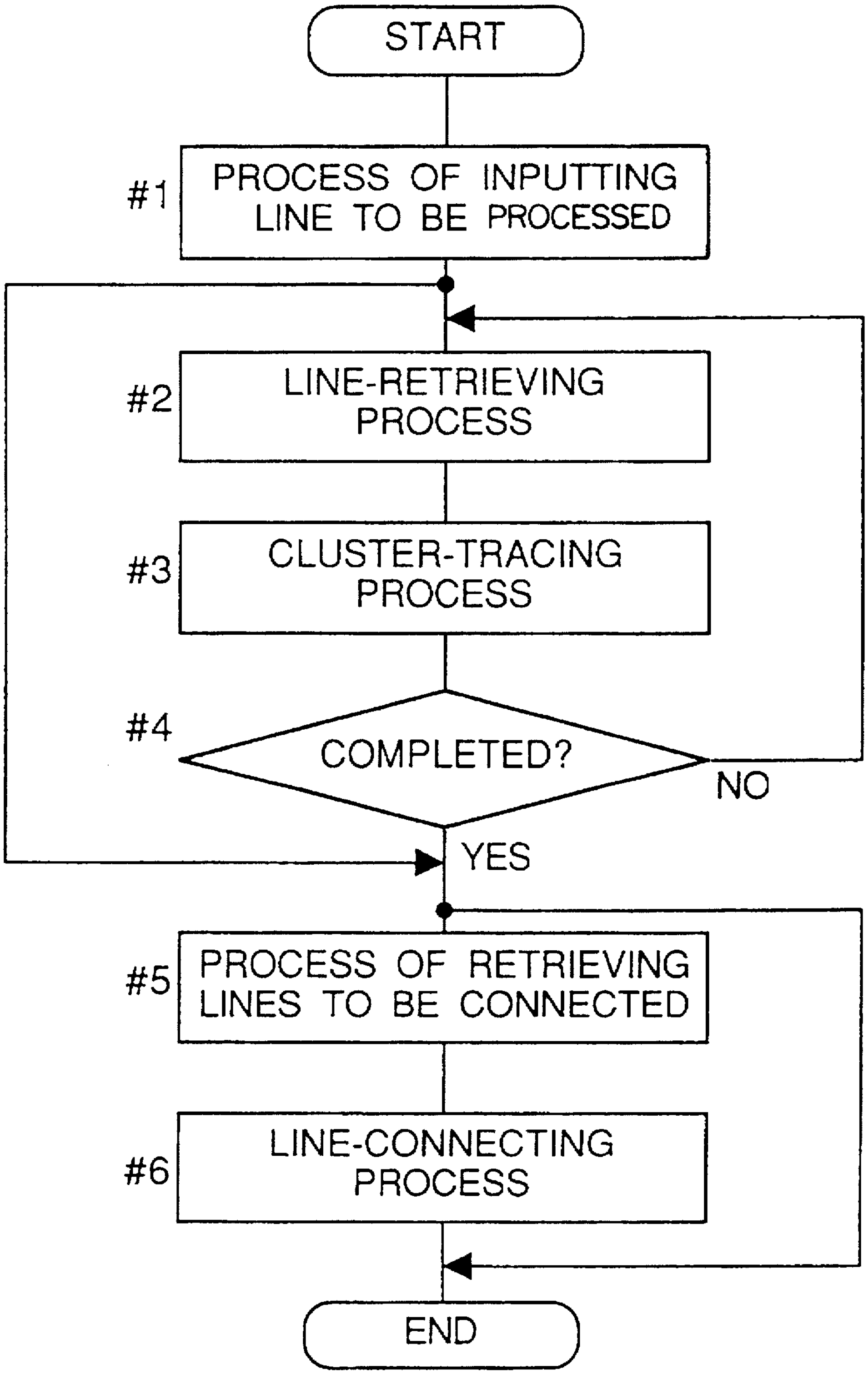
FIG. 1 is a flowchart showing a method according to a first embodiment of the present invention.

Before the description of the present invention proceeds, it is to be noted that like parts are designated by like reference numerals throughout the accompanying drawings.

A line image processing method according to a first embodiment of the present invention will be described below with reference to FIGS. 1 through 20. In the first embodiment, the line image processing method is used to inspect the external view of a video head.

FIG. 1 is a flowchart of the first embodiment.

At step #1, a line image to be processed is inputted to the image pickup and processing apparatus. Then, the program goes to step #2 or #5 according to a predetermined flow. That is, the program goes to step #2 if the line image to be shaped has defects in that short lines are defectively exist in the line image. As examples of such defects, there are the following line or lines which defectively and dispersedly exist in the line image to be shaped: a line which is connected to a line to make a long line or to make a branch line, lines which must be connected to each other and which are separated from each other, a line which is connected with an unnecessary short line, or a line which has a short line indicating noise. At step #2, a line is retrieved and then at step #3, a cluster is traced. Then, it is decided whether or not the line-retrieving process and the cluster-tracing process are completed at step #4. When completed, the program goes to step #5. Also, after step #1, if lines which must be connected to each other are discontinuous in the line image to be shaped, the program goes to step #5. At step #5, lines which must be connected to each other are retrieved. Then, at step #6, the retrieved lines which must be connected to each other are connected to each other, and then the program terminates.

As the line image to be processed in this case, either a line image obtained by thinning a binary image formed by binarizing a gray image or a line image obtained by an arbitrary method can be processed. As one example of the latter method instead of the former binarizing method, there is a method in which for example, when a line image to be processed has a narrow configuration, the image is expressed by from 0 to 256 gray scales in a 256 total gray scale and then, supposing that a threshold is a 20 gray scale, a portion of the image is detected as a line when the portion thereof has gray scale equal to or greater than 20 and a portion of the image is not detected as a line when the portion thereof has gray scale less than 20. The thickness of the line is not limited to a specific thickness, but preferably, the thickness of one line corresponds to one pixel.

Figure 2:
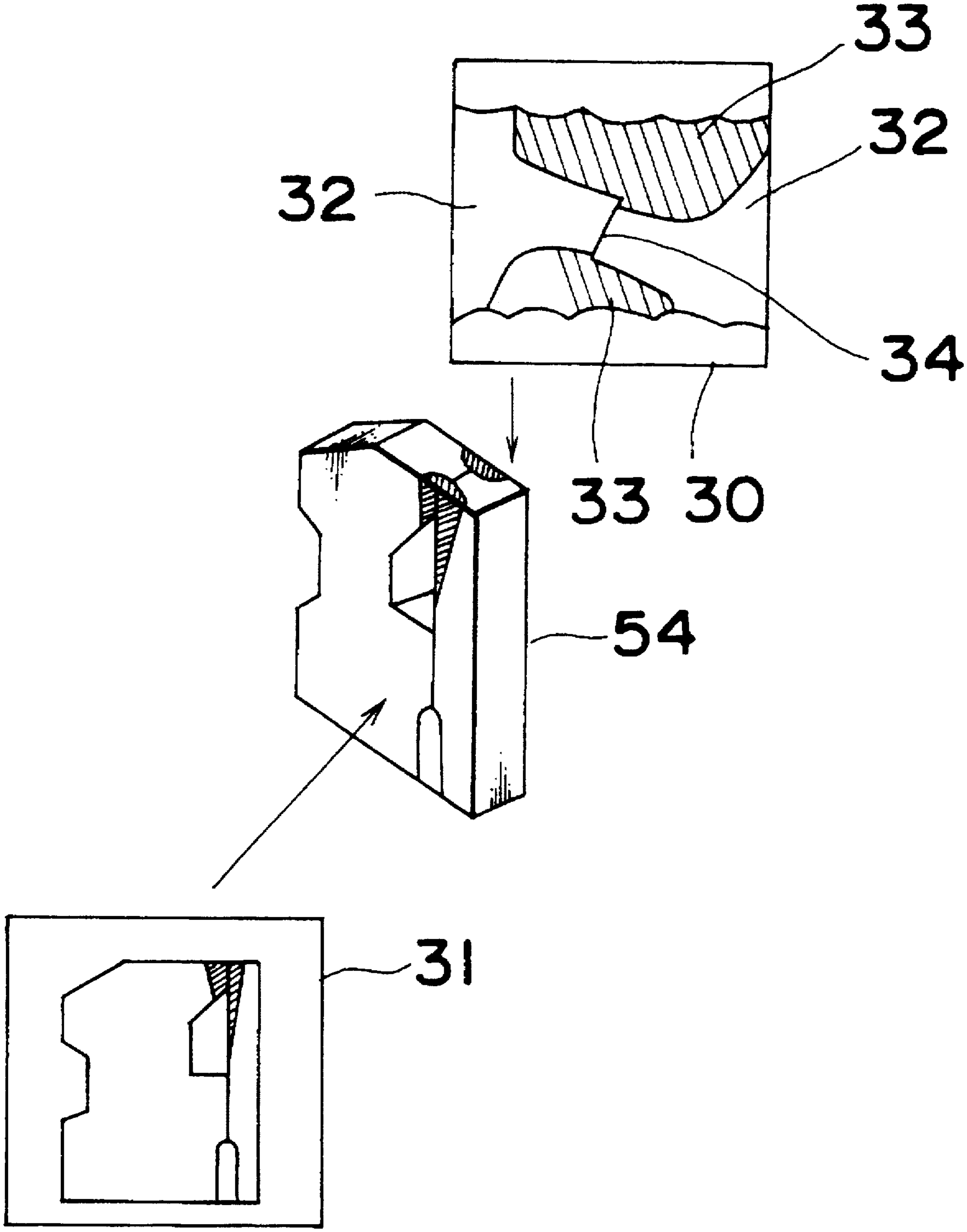
FIG. 2 is a view showing an object to be inspected and/or measured by the method according to the first embodiment shown in FIG. 1.

A video head, the external appearance of which is to be inspected has a construction as shown in FIG. 2. In FIG. 2, the external appearance of a front surface 30 of a video head 54 having a side surface 31 is inspected. The object surfaces of the front surface 30 are a ferrite section 32, a glass section 33, and a gap section 34.

Figure 3:
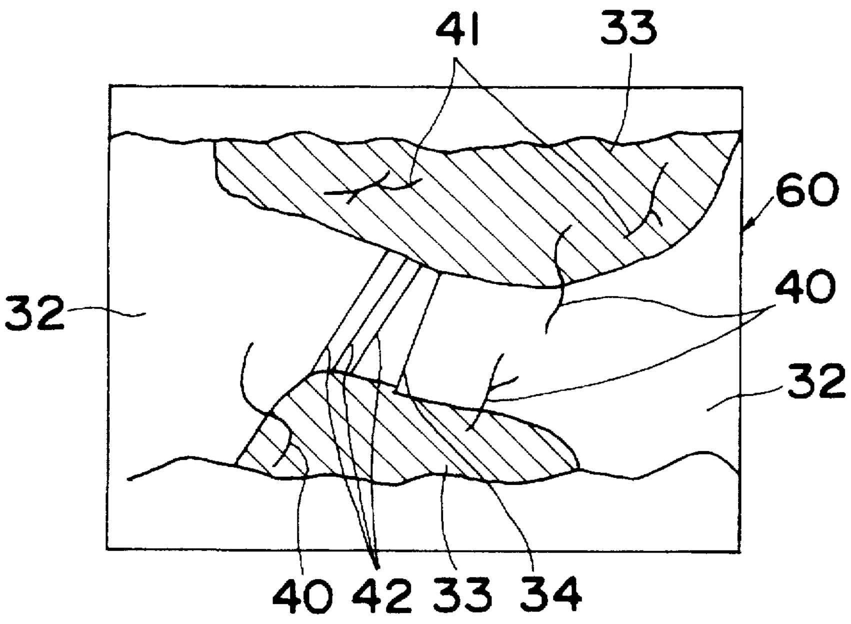
FIG. 3 shows an image of the object to be inspected and/or measured by the method according to the first embodiment shown in FIG. 1.
Figure 4:
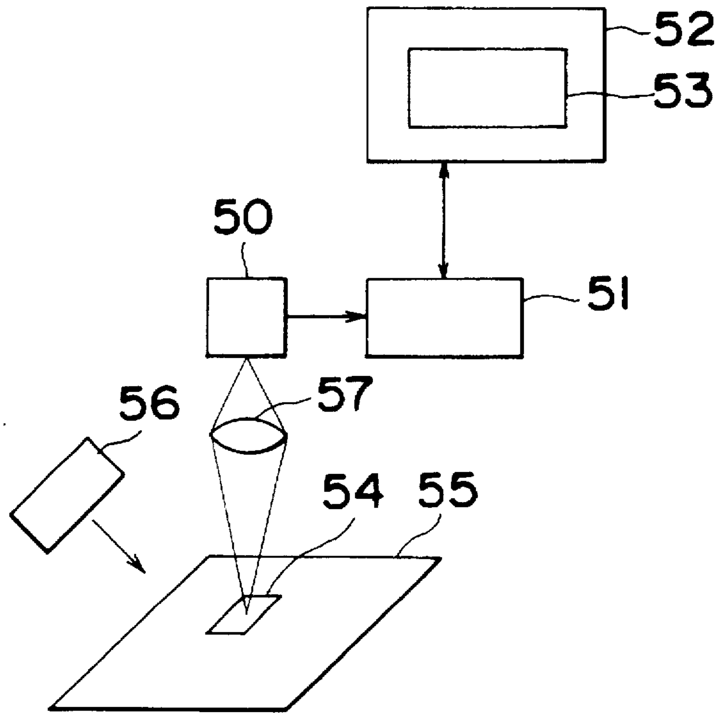
FIG. 4 shows an image pickup and/or processing apparatus using the method according to the first embodiment shown in FIG. 1.

An image 60 of the front surface 30 is shown in FIG. 3. The image 60 is processed by the image pickup and processing apparatus shown in FIG. 4. The image pickup and processing apparatus comprises an image pickup device 50; a controller 51 of the image pickup device 50; an image processing device 52; an image memory 53; a stage 55; an illuminating device 56; and a lens 57. The image on the front surface 30 of FIG. 2 has a crack 40, a glass flaw 41, and a process flaw 42. The crack 40 is caused mainly by a crack formed in the ferrite section 32 of the video head 54. The glass flaw 41 is caused by a crack formed in the glass section 33. The process flaw 42 arranged in a certain direction is generated in processing the ferrite section 32.

Figure 5:
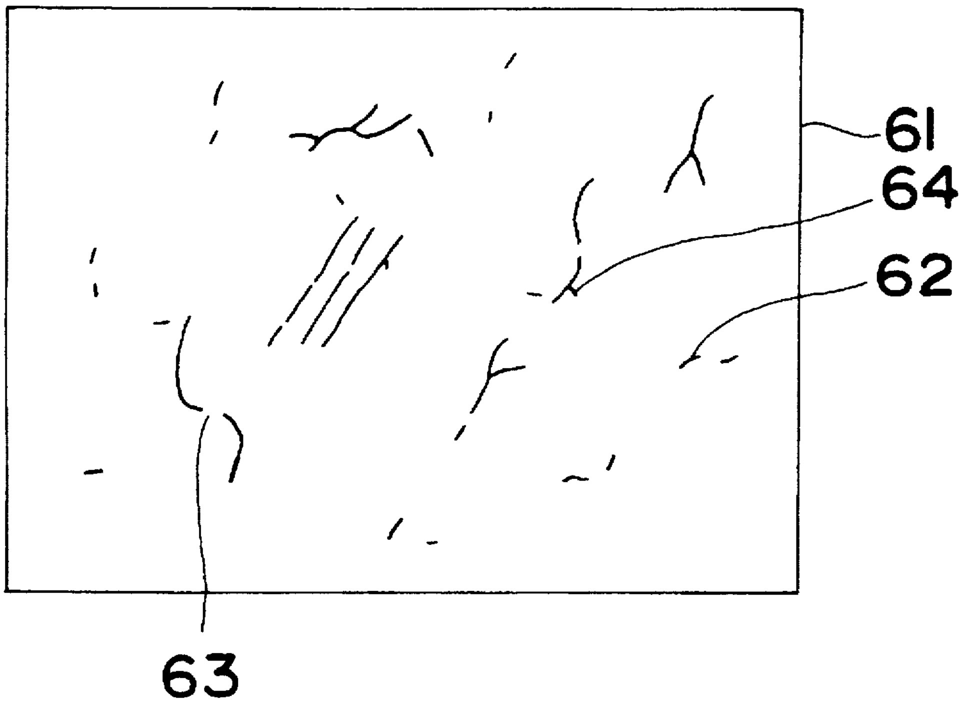
FIG. 5 shows a line image to be processed by the method according to the first embodiment shown in FIG. 1.
Figure 6:
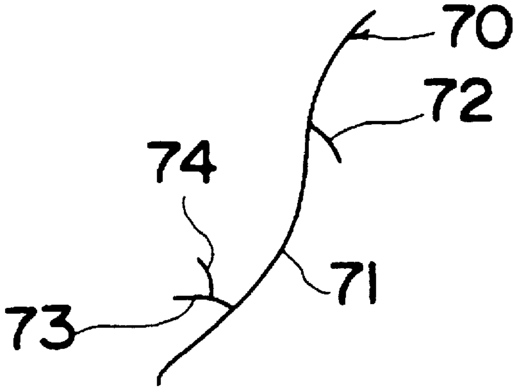
FIG. 6 is an enlarged view of which a portion in FIG. 5 is enlarged.
Figure 7:
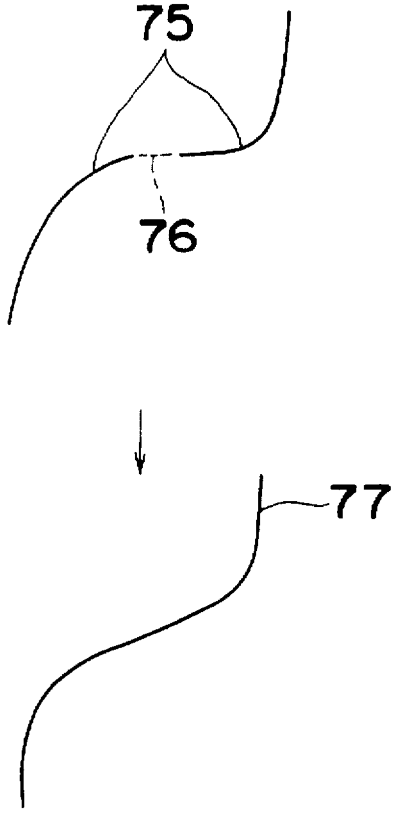
FIG. 7 is a view in which a line is processed by the method according to the first embodiment shown in FIG. 1.
Figure 8:
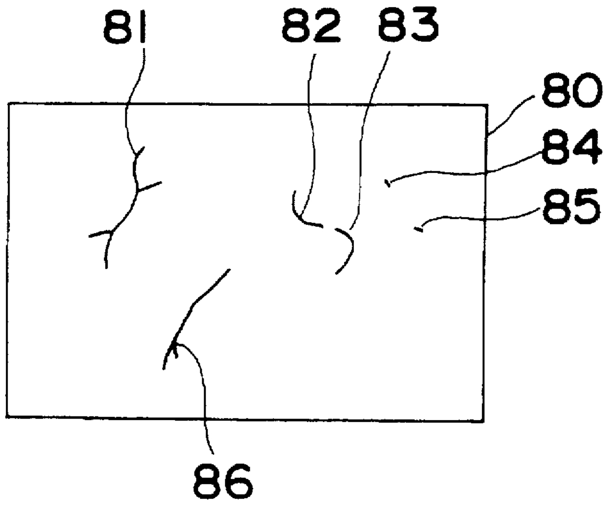
FIG. 8 is a view in which lines of FIG. 5 have been simplified.

The image 60 of the video head 54 picked up by the image pickup device 50 is supplied to the image processing device 52. The image processing device 52 binarizes the image 60 and a thinning process is applied to the binary image to thin the image by using lines, thus generating a line image 61 as shown in FIG. 5. The line image 61 is inputted to the image memory 52. These processes are performed by known methods. The line image 61 processed by the known methods normally has a discontinuous short line 62 indicating noise, a discontinuous portion 63 in which lines which must be connected to each other are discontinuous, and a continuous short line 64 which is originally noise and should not be connected to a line. Therefore, a correct determination cannot be made based only on the line image 61 itself. The first embodiment is distinguished from the known method in the following feature obtained by the processing performed at step #2 in FIG. 1 and the steps #3–6 subsequent thereto. That is, the following defective line image is processed into a corrected line image. That is, the following line or lines defectively and dispersedly exist in the line image to be processed: a line which is connected to a line which must be disconnected from the line to make a long line or make a branch line, lines which must be connected to each other which are separated from each other, a line which is connected to an unnecessary short line, or a line which has a short line indicating noise. The processed line image allows a decision to be made as to which of the crack 40, the glass flaw 41, and the process flaw 42 each line belongs to. More specifically, as shown in FIG. 6, the first embodiment is characterized in that lines 71, 72, 73, and 74 separated from a line 70, are processed in the order from a line having an end point disposed at a higher position and a more leftward position than lines having end points disposed at lower positions and less leftward positions, and a line less than a predetermined length is erased. The first embodiment is also characterized in that lines 75 having a discontinuous portion 76 which should be connected thereto is converted into a continuous line 77 as shown in FIG. 7. An image 80 shown in FIG. 8 formed by simplifying the image shown in FIG. 3 is used for the description which will be made hereinafter. The image 80 has a line 81 having branch lines, discontinuous lines 82 and 83 which must be connected to each other, lines 84 and 85 indicating noise, and a short line 86.

Figure 9:
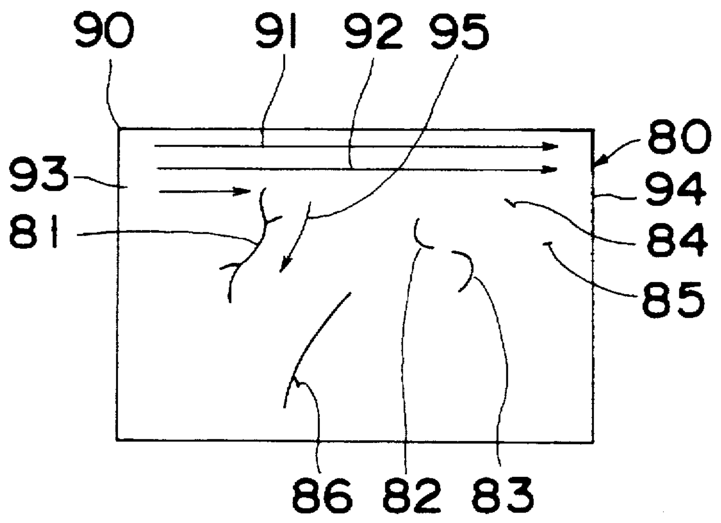
FIG. 9 is a view showing a line-retrieving process executed by the method according to the first embodiment shown in FIG. 1.

Referring to FIG. 9, in the line-retrieving process executed at step #2 in FIG. 1, lines are retrieved by the raster scan along a line 91 in the order from an upper left end point 90 of the image 80 to the right. When the scan has reached a right end row 94, the scan returns to a left end row 93 to retrieve a line 92. The retrieval continues until the line 81 is found. When the line 81 has been found, the program goes to step #3 in FIG. 1.

Figure 10:
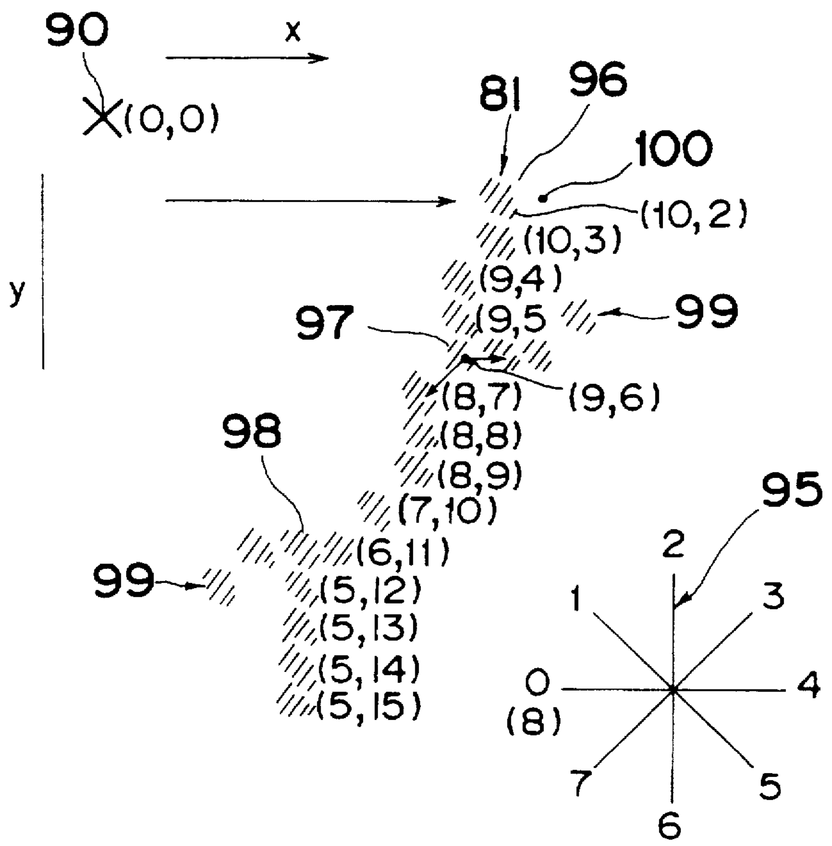
FIGS. 10, 11, 12, 13, and 14 are views showing a cluster-tracing process executed by the method according to the first embodiment shown in FIG. 1.

In the cluster trace process executed at step #3 in FIG. 1, the lines 71, 72, 73, and 74, separated from the line 70, are processed in the order from a line having an end point disposed at a higher position and a more leftward position than lines having end points disposed at lower positions and less leftward positions, and a line less than a predetermined length is erased as described previously. This process is described based on FIGS. 10 and 11. The line 81 is traced by using a direction code 95 shown in FIG. 10. In FIG. 10, one square corresponds to one pixel. In the coordinate of FIG. 10, an origin 90 is set at the upper left end point, and the region in the right from the origin 90 is the positive side in the X-direction, and the region downward from the origin 90 is the positive side in the Y-direction. The line 81 from an end point (10, 2) 96 to a point (9, 5) is traced based on the direction code and image data of the coordinate as follows:

direction code 6 7 6 6 ?

coordinate (10, 2) (10, 3) (9, 4) (9, 5) (9, 6)

A plurality of direction codes 4 and 7 exist at a branch point (9, 6) 97. The average of the two preceding direction codes is compared with the direction codes 4 and 7 to adopt the direction code 4 or the direction code 7 closer to the average of the two preceding direction codes. That is, at the branch point (9, 6) 97, the average of the two preceding direction codes with respect to the branch point (9, 6) 97 is (6+6)/2=6. Accordingly, 7 which is closer to 6 is adopted as the direction code. Tracing proceeds toward a point (8, 7) existing in the direction code 7.

The tracing of the line 81 from a branch point (9, 6) to a branch point (7, 10) is executed as follows:

direction code 7 6 6 7 7 ?

coordinate (9,6) (8,7) (8,8) (8,9) (7,10) (6,11)

A plurality of direction codes 7 and 8 exist at a branch point (6, 11) 98. Similarly to the above case, the average of the two preceding direction codes is compared with the direction codes 7 and 8 to adopt the direction code 7 or 8 closer to the average of the two preceding direction codes. That is, at the branch point (6, 11) 98, the average of the two preceding direction codes with respect to the branch point (6, 11) 98 is (7+7)/2=7. Accordingly, 7 which is closer to 7 is adopted as the direction code. Tracing proceeds toward a point (5, 12) existing in the direction code 7. In the direction code in the left and right directions, if a direction code which proceeds a present direction code by one is 5 to 7 and 1 to 3, the direction code is set as 8 and 0, respectively.

The following direction code and coordinate are obtained by the similar process. The direction code at an end point is set as −1.

direction code 7 6 6 6 −1 coordinate (6,11) (5,12) (5,13) (5,14) (5,15)

A line obtained by the tracing by using image data is hereinafter referred to as "a cluster".

Figure 11:
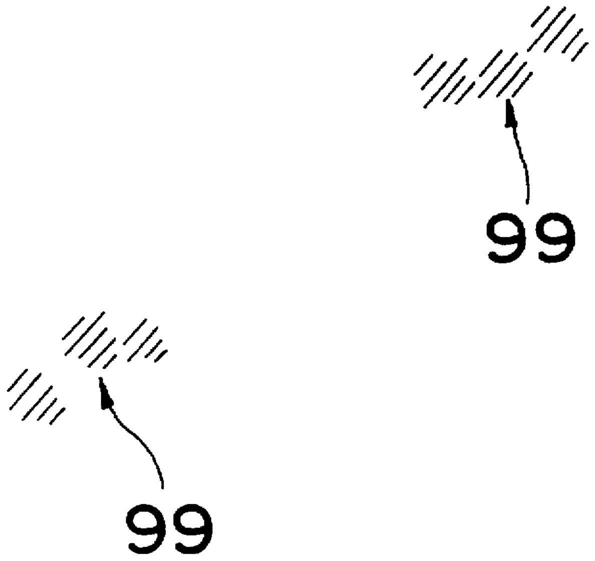

In the cluster trace process executed at step #3 in FIG. 1, the image data of the traced coordinate is erased from the image 80. At the same time, the image data of a cluster is stored in a different region, namely, a different shaped line image to set the cluster as "cluster 1". FIG. 11 is a view obtained by subtracting the image data of the cluster 1 from the image data of FIG. 10. In FIG. 11, a plurality of lines 99 separated from the line 81 remain.

When the trace of the cluster 1 is completed but the trace of another cluster is not completed at step #4 in FIG. 1, the program returns to step #2 in FIG. 1. When the trace of all clusters is completed at step #4 in FIG. 1, the program goes to step #5 in FIG. 1.

Figure 12:
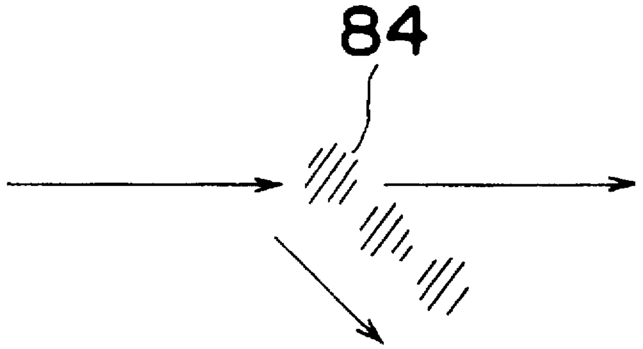
Figure 13:
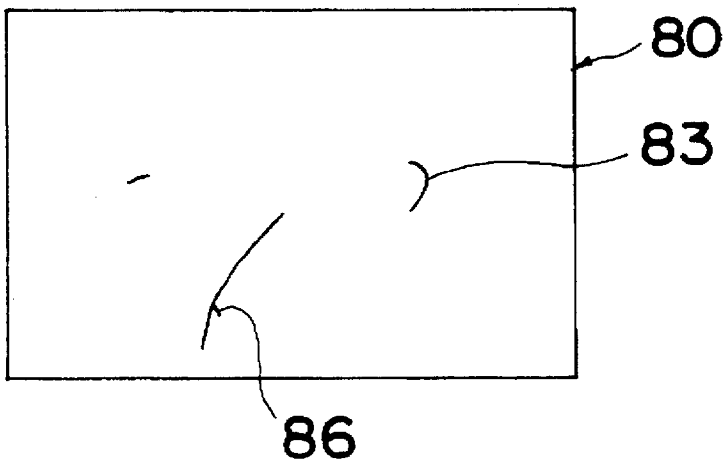

At step #2, the raster scan starts from a pixel 100 (see FIG. 10) subsequent to an initial end point (10, 2) 96 of the cluster 1. After a line 84 shown in FIGS. 9 and 12 is found by the raster scan, the program goes to step #3.

At step #3, when the line 84 has been traced, the direction code thereof is 5, 5, −1. A short cluster having a length corresponding to three pixels or less is erased as noise in the first embodiment, and then the cluster having its direction codes of 5, 5, −1 is erased and the program returns to step #2.

Figure 14:
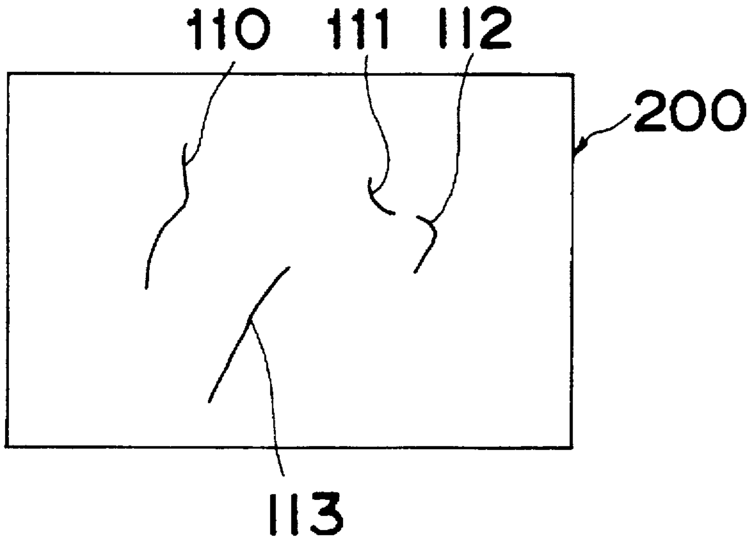

When the trace of the line 82 of the line image 80 of FIG. 9 is completed by repeatedly executing the processing similar to the above, two clusters are obtained. As a result of the tracing, the line image 80 of FIG. 9 is changed into that shown in FIG. 13. When the trace of the all lines existing in the line image 80 of FIG. 9 is completed by repeatedly executing the processing similar to the above, lines 83 and 86 of the line image 80 of FIG. 9 are added as clusters and thus four clusters are obtained in total. A shaped line image 200 comprised of four clusters 110, 111, 112, and 113 is obtained as shown in FIG. 14.

In the first embodiment, a line having a length less than a predetermined length is erased. The timing of erasing the line and the predetermined length can be determined depending on the state of a line image or the purpose of image processing. For example, the line can be erased when a cluster is transferred to a different shaped line image or after all clusters are transferred to the different shaped line image.

All lines constituting the processed line image have their data. Therefore, the processed line image can be processed for various purposes such as inspection or measurement.

If the processed line image 200 which is to be processed has been processed appropriately for a purpose such as inspection or measurement, the processing terminates at step #4. If not, the program goes from step #4 to step #5.

In the process of retrieving lines to be connected to each other at step #5, the line image to be processed inputted at step #1 or the processed line image 200 obtained at step #3 is scanned to retrieve two lines, the end points of which are close and opposed to each other. Then, the program goes to step #6.

Figure 15:
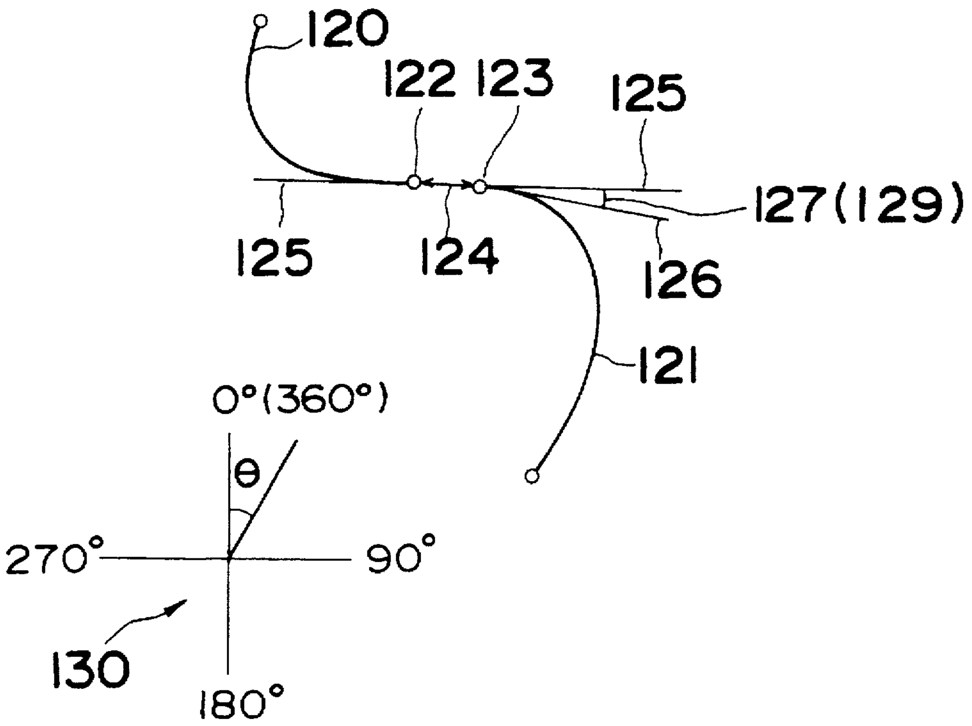
FIGS. 15 and 16 are views showing a line-connecting process executed by the method according to the first embodiment shown in FIG. 1.
Figure 38A:
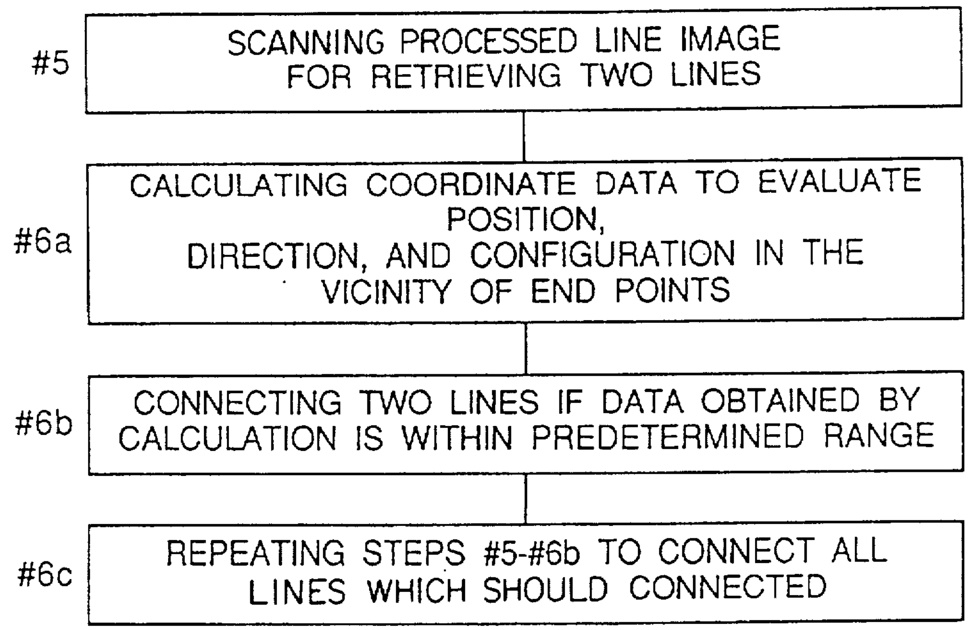
FIG. 38A is a flowchart showing a step wherein lines which must be connected to each other are retrieved and a step wherein the retrieved lines which must be connected to each other are connected to each other, and then the program terminates in accordance with the first embodiment.

In the line-connecting process to be executed at step #6, when it is detected at step #5 that the end point of a first line 120 and that of a second line 121 in FIG. 15 are opposed and close to each other, at step #6 a determination is made as to whether or not they should be connected to each other. As shown in FIG. 38A, after step #6 for scanning the processed line image for retrieving the two lines, the step #6 includes the steps for calculating coordinate data to evaluate coincidence degrees of a position, direction, and a configuration in the vicinity of the end points of the retrieved two lines at step #*6a;* connecting the two lines to each other if the data obtained by the calculation is within a predetermined range at step #*6b;* and repeating the above steps #5, #*6a,* and #*6b* to connect all lines required to be connected at step #*6c.*

As feature parameters to be used as a means for deciding whether or not the first and second lines 120 and 121 should be connected to each other, the following values are used: The distance 124: p1 between an end point 122 of the first line 120 and an end point 123 of the second line 121; the difference 127: p2 between the average direction 125 in the vicinity of the end point 122 of the first line 120 and the average direction 126 in the vicinity of the end point 123 of the second line 121; the difference 128: p3 between the line connecting the end point 122 and the end point 123 with each other and the average direction 125 (in FIG. 15, the line connecting the end point 122 and the end point 123 with each other coincides with the average direction 125); and the difference 129: p4 between the line connecting the end point 122 and the end point 123 with each other and the average direction 126 (in FIG. 15, the differences 127 and 129 coincide with each other). In this case, an angle to be used to calculate the above values is determined with respect to the coordinate axes 130. The configuration of a radius of curvature in the vicinity of each end point of the lines 120 and 121 may also be used as a feature parameter to be used as a means for determining whether or not the lines 120 and 121 should be connected to each other. That is, an arbitrary feature parameter may be used so long as it is capable of evaluating the coincidence degree of the position, the direction, and the configuration in the vicinity of the end points of the two lines 120 and 121, the end points of which are opposed to each other.

Preferably, the values p1, p2, p3, and p4 are small. As a parameter for evaluating the degree of coincidence between the first and second lines 120 and 121, the values p1, p2, p3, and p4 are calculated by the result obtained by calculation such as multiplication, addition, combination of multiplication and addition, or calculation and evaluation for each classified group which is arbitrarily selected. If the result of calculation is smaller than a predetermined threshold, the first and second lines 120 and 121 are connected with each other.

The following parameters are used in the first embodiment.

Evaluating parameter: $p1 \times p2 \times (p3+p4)$

If the evaluating parameter $p1 \times p2 \times (p3+p4)$ is smaller than the predetermined threshold, the first and second lines 120 and 121 are connected with each other.

Figure 16:
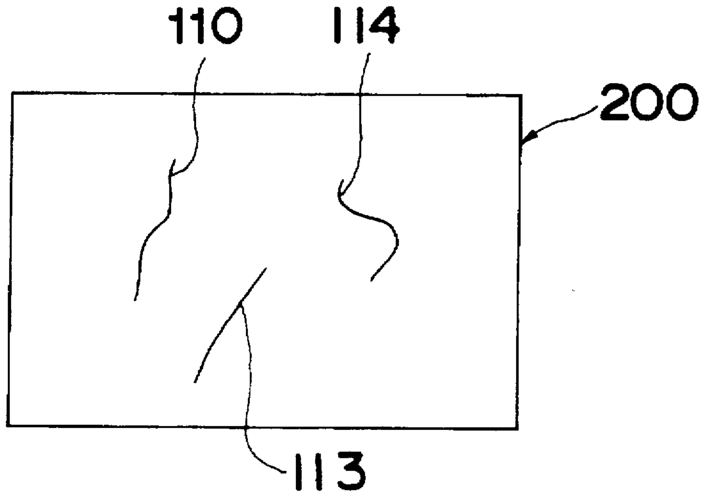

A cluster 114 shown in FIG. 16 is obtained by connecting the clusters 111 and 112 shown in FIG. 14 with each other. That is, FIG. 16 shows a re-shaped line image.

Figure 17:
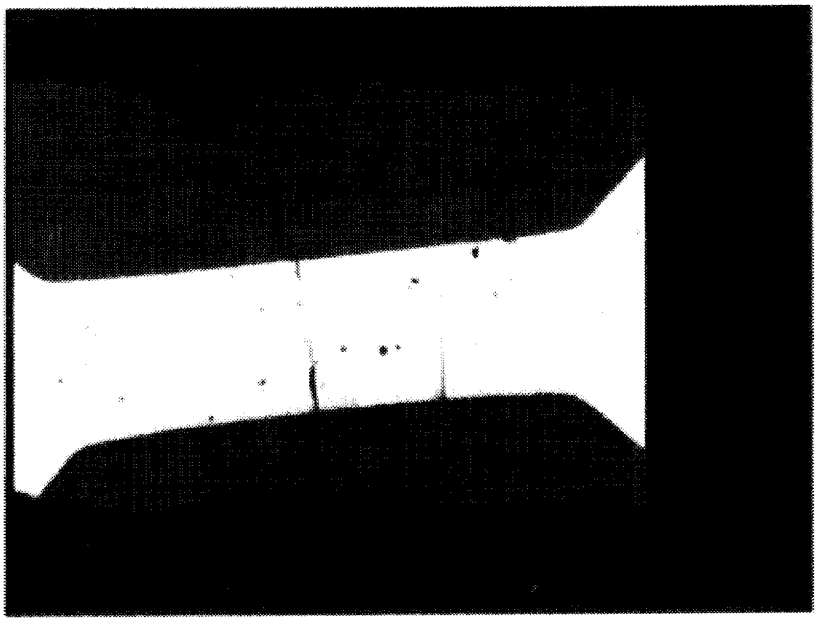
FIG. 17 shows an image of the object to be inspected and/or measured by the method according to the first embodiment shown in FIG. 1.
Figure 18:
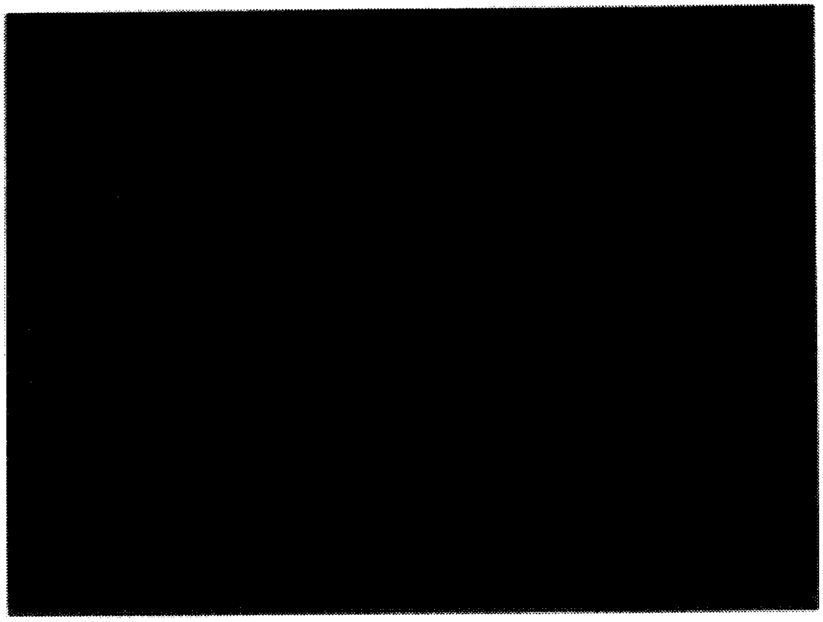
FIG. 18 shows a line image of the object to be inspected and/or measured by the method according to the first embodiment shown in FIG. 1.
Figure 19:
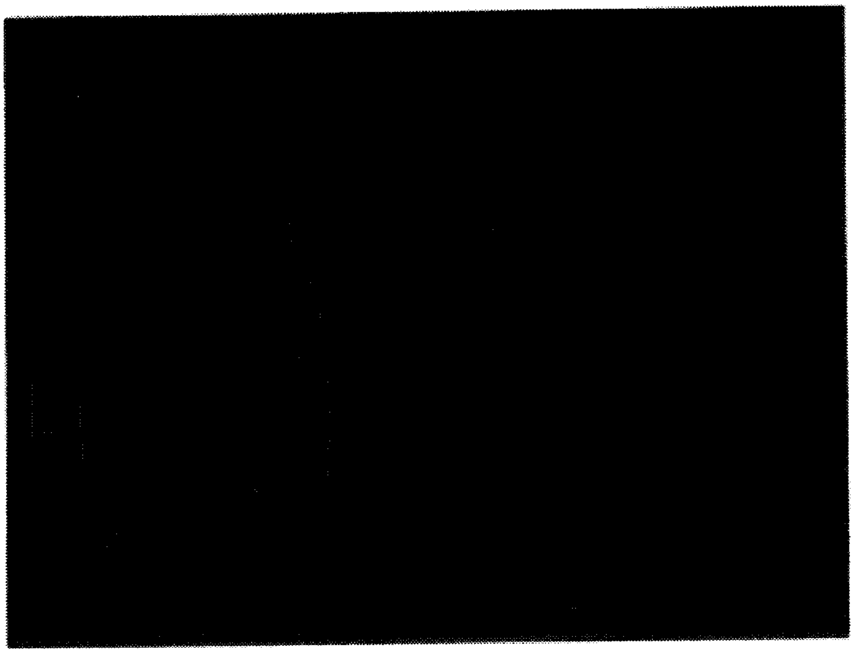
FIGS. 19 and 20 are views showing a processed line image of the object to be inspected and/or measured by the method according to the first embodiment shown in FIG. 1.
Figure 20:
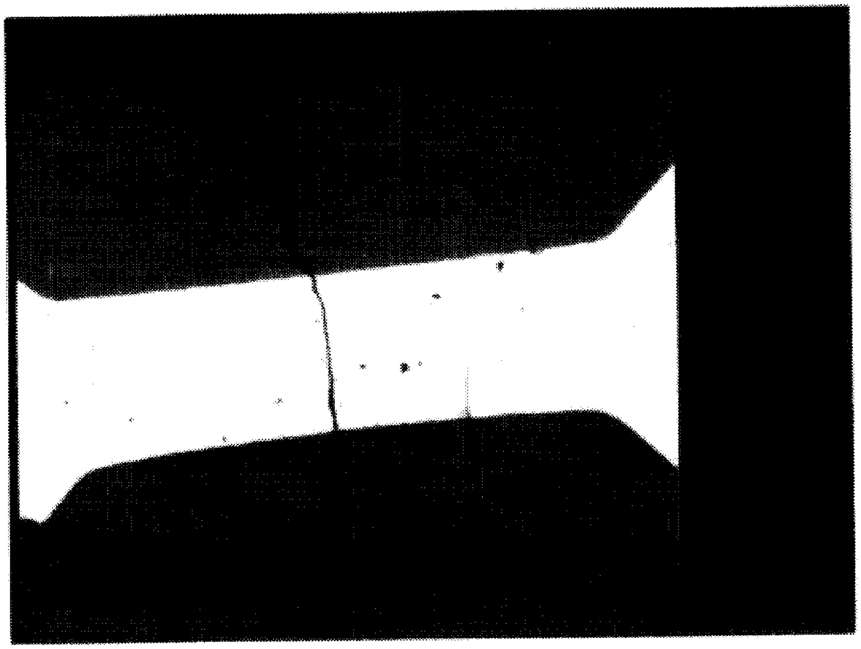
Figure 21:
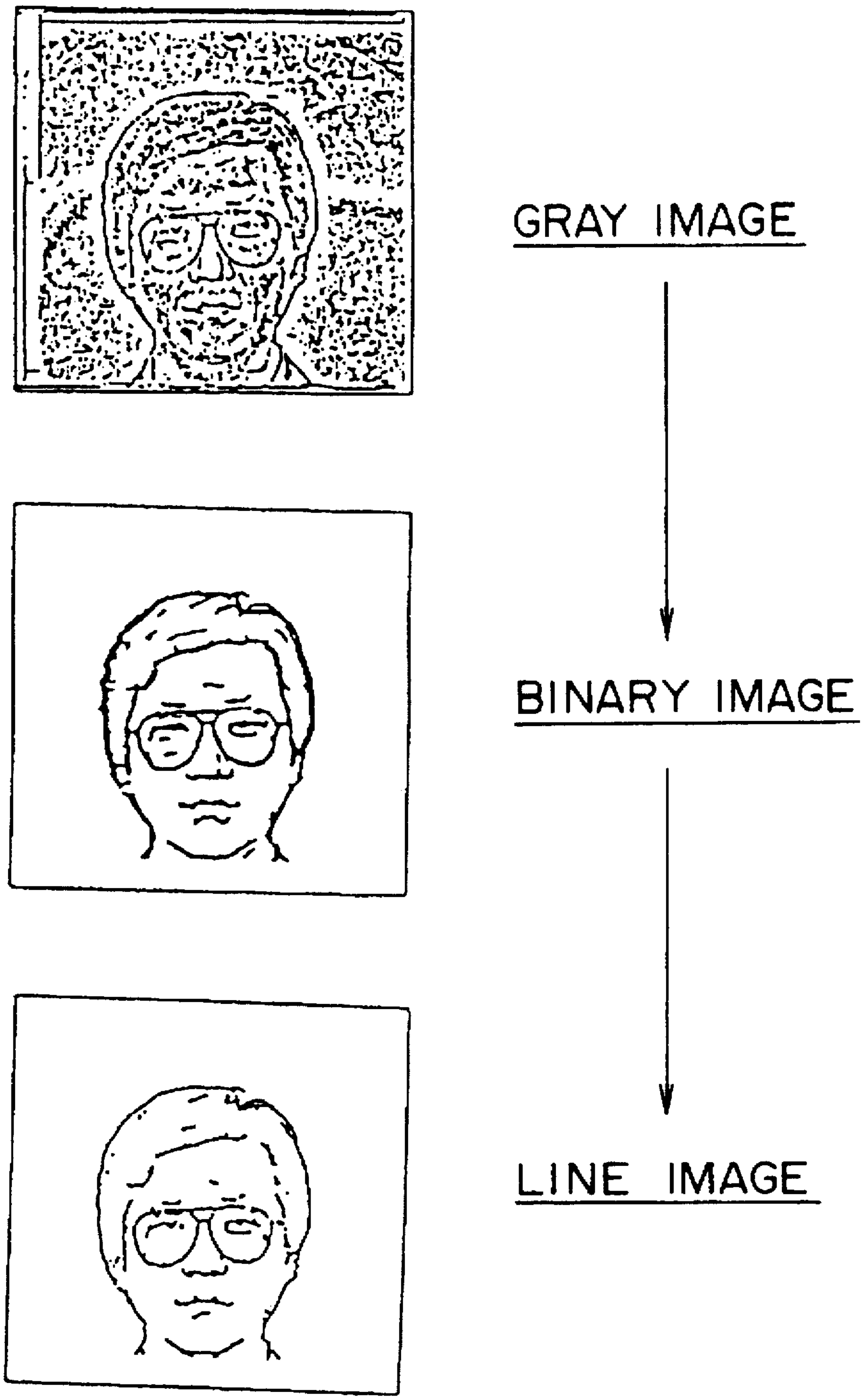
FIG. 21 is a view showing a line image formed by a conventional method.
Figure 22:
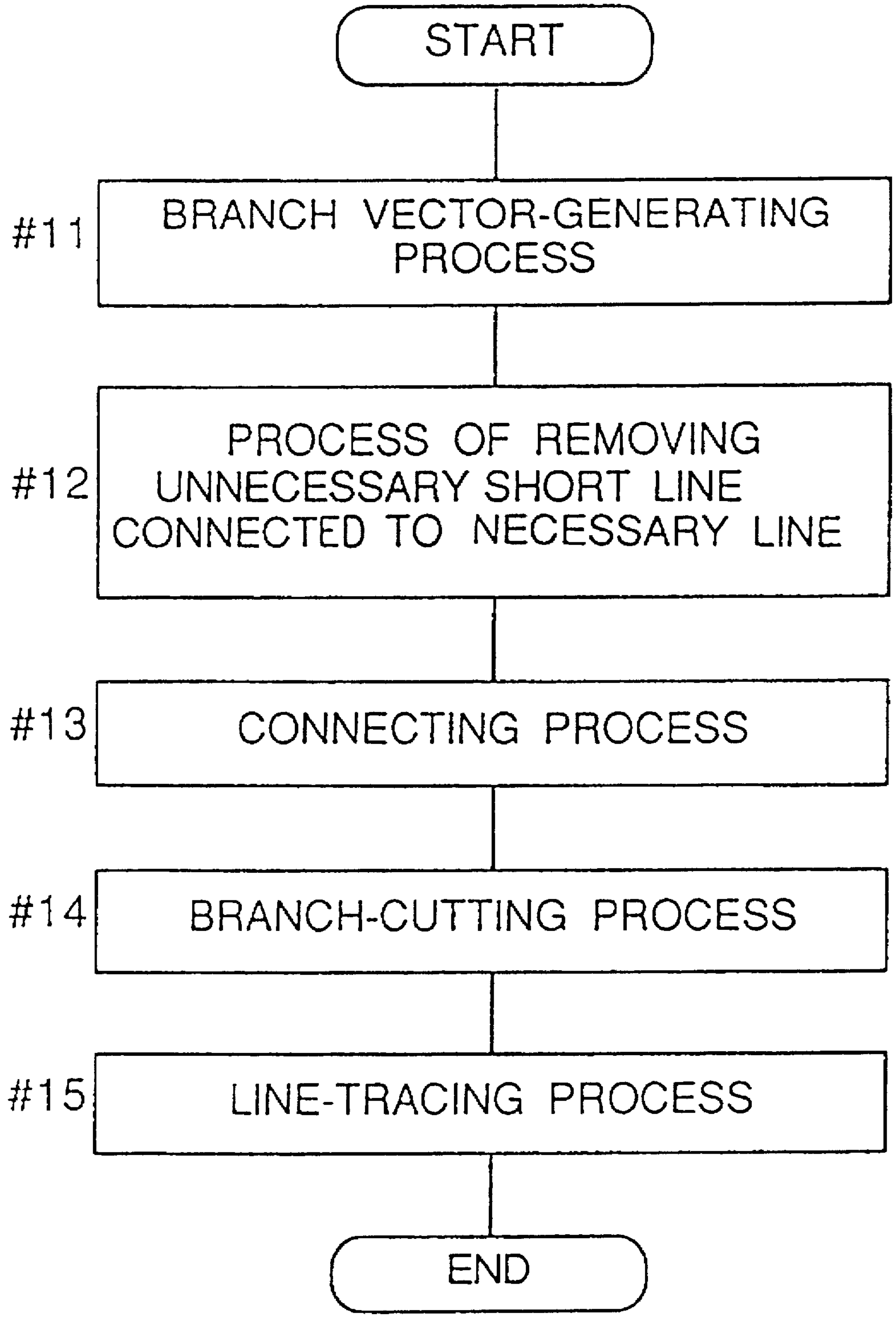
FIG. 22 is a flowchart showing the conventional method.
Figure 23:
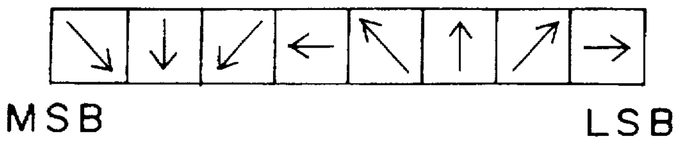
FIG. 23 is a view showing orientations of pixels.
Figure 24:
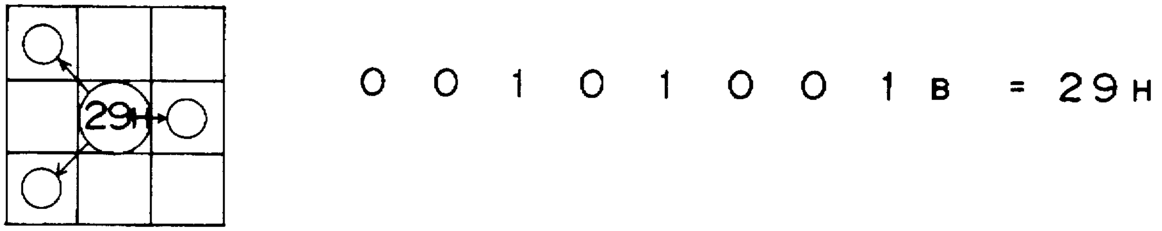
FIGS. 24 and 25 are views showing branch vectors 10 used in the conventional method.
Figure 25:
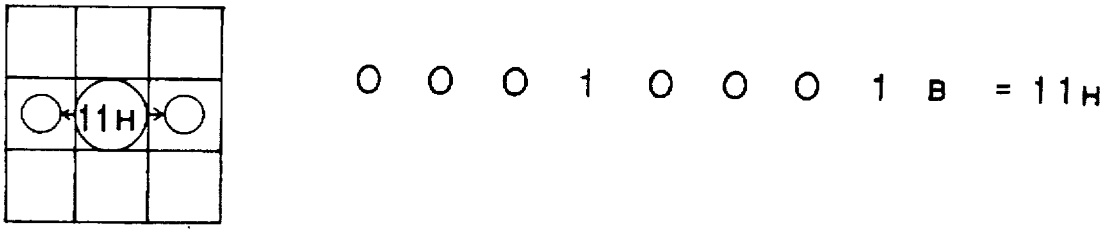
Figure 26:
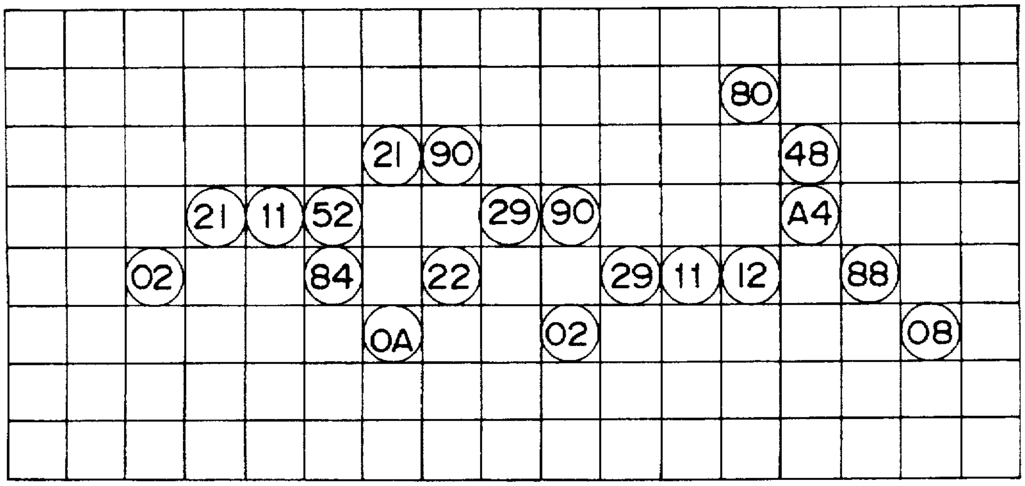
FIG. 26 is a view showing branch vectors and how pixels constituting a line image are addressed.
Figure 27:
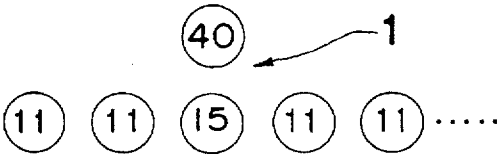
FIGS. 27 and 28 are views showing a short line connected to a long line generated by the conventional method.
Figure 28:
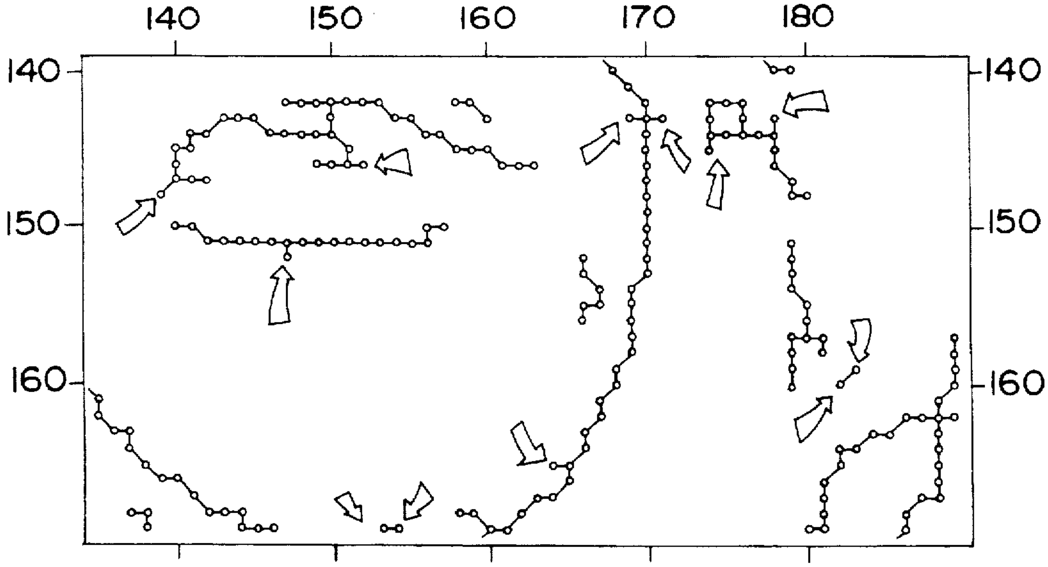
Figure 29:
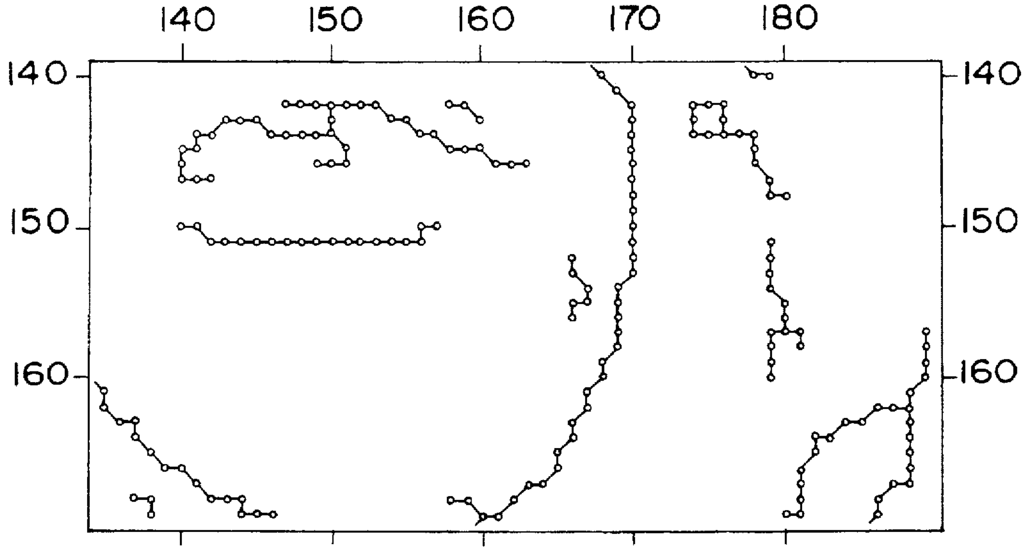
FIG. 29 is a view showing a line image in which short lines connected to long lines have been removed by the conventional method.
Figure 30:
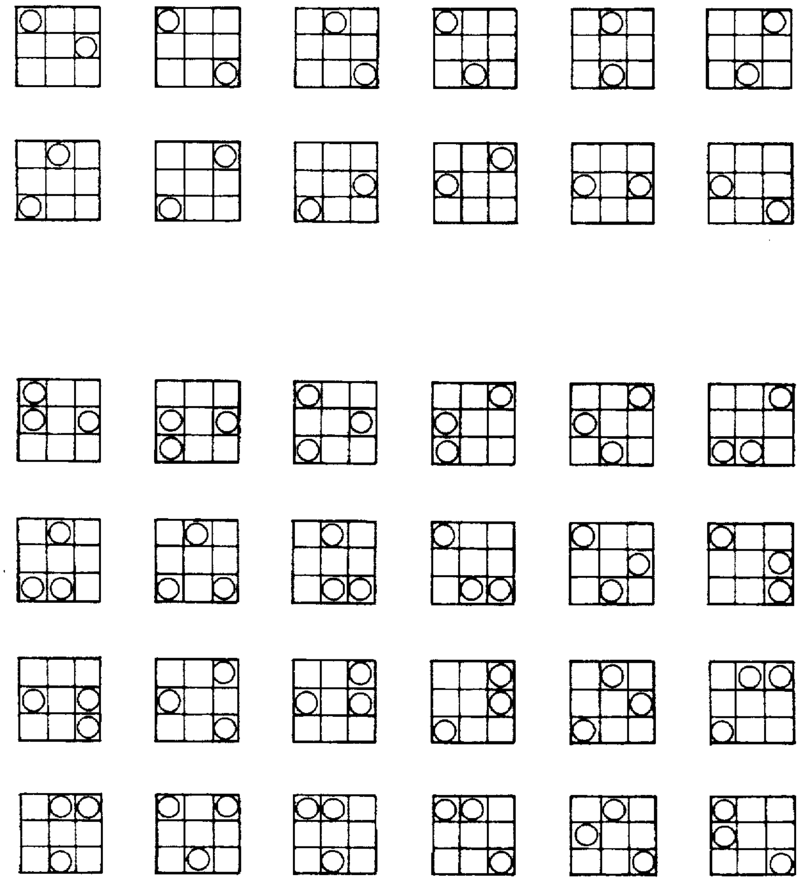
FIG. 30 is a view showing a conventional method of connecting patterns to each other.
Figure 31:
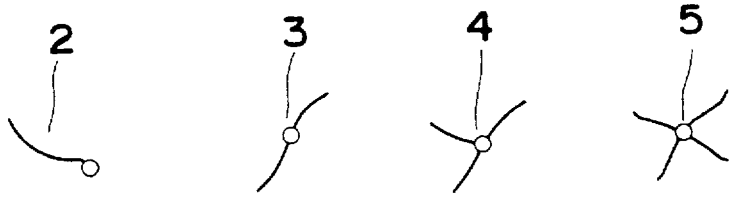
FIG. 31 is a view showing branch points to be processed by the conventional method.
Figure 32:
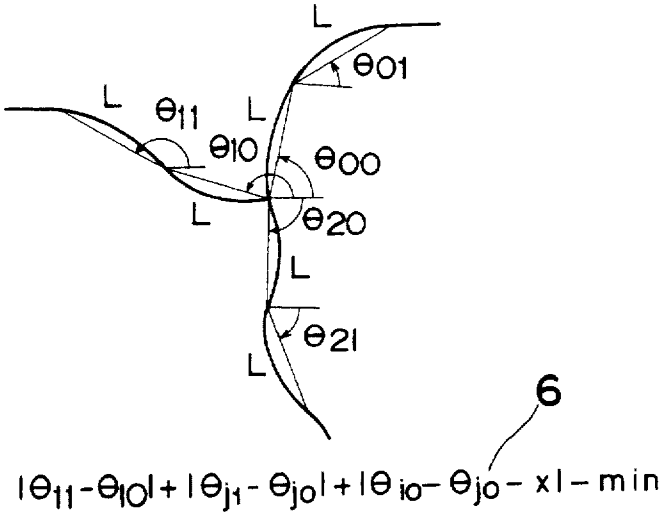
FIGS. 32 and 33 are views showing the conventional method of separating a branch line from a branch point.
Figure 33:
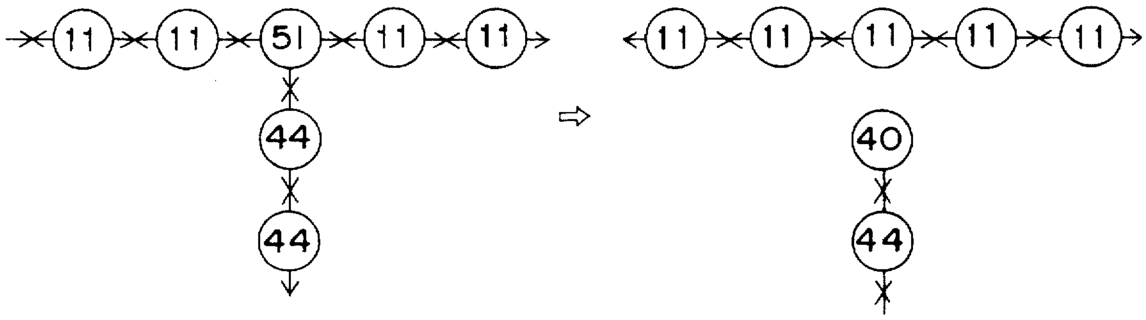
Figure 34:
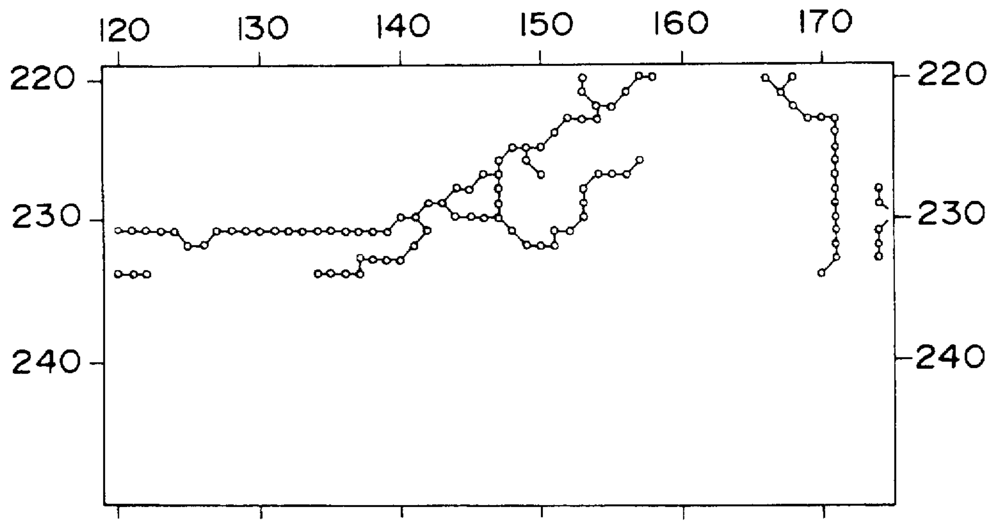
FIG. 34 is a view showing a line image, formed in the conventional method, in which a branch line has not been removed from a branch point.
Figure 35:
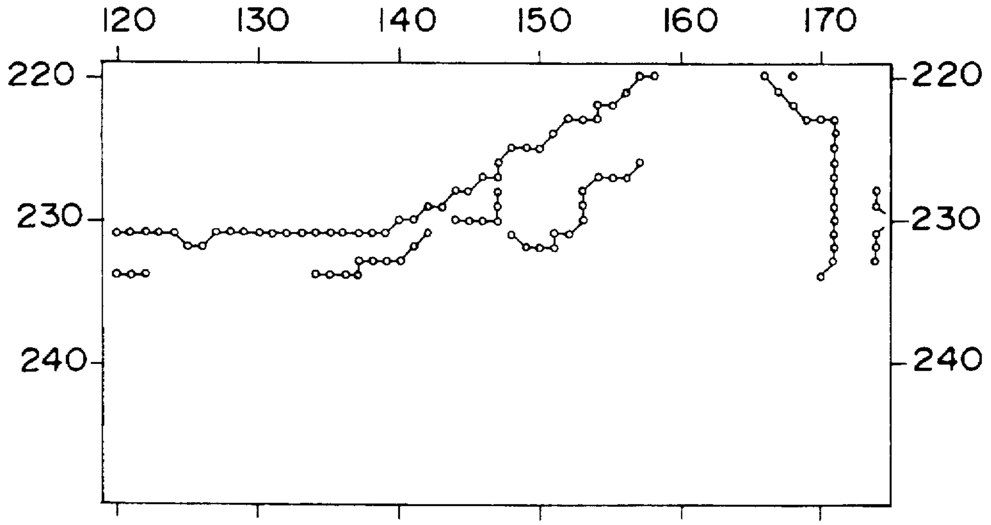
FIG. 35 is a view showing a line image, formed in the conventional method, in which a branch line has been removed from a branch point.
Figure 36:
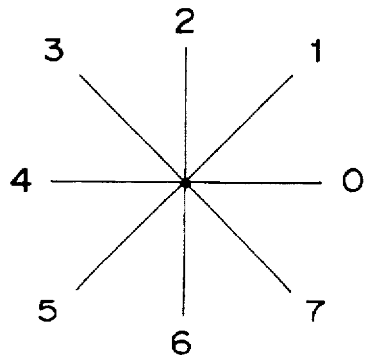
FIG. 36 is a view showing a direction code used by the conventional method.
Figure 37:
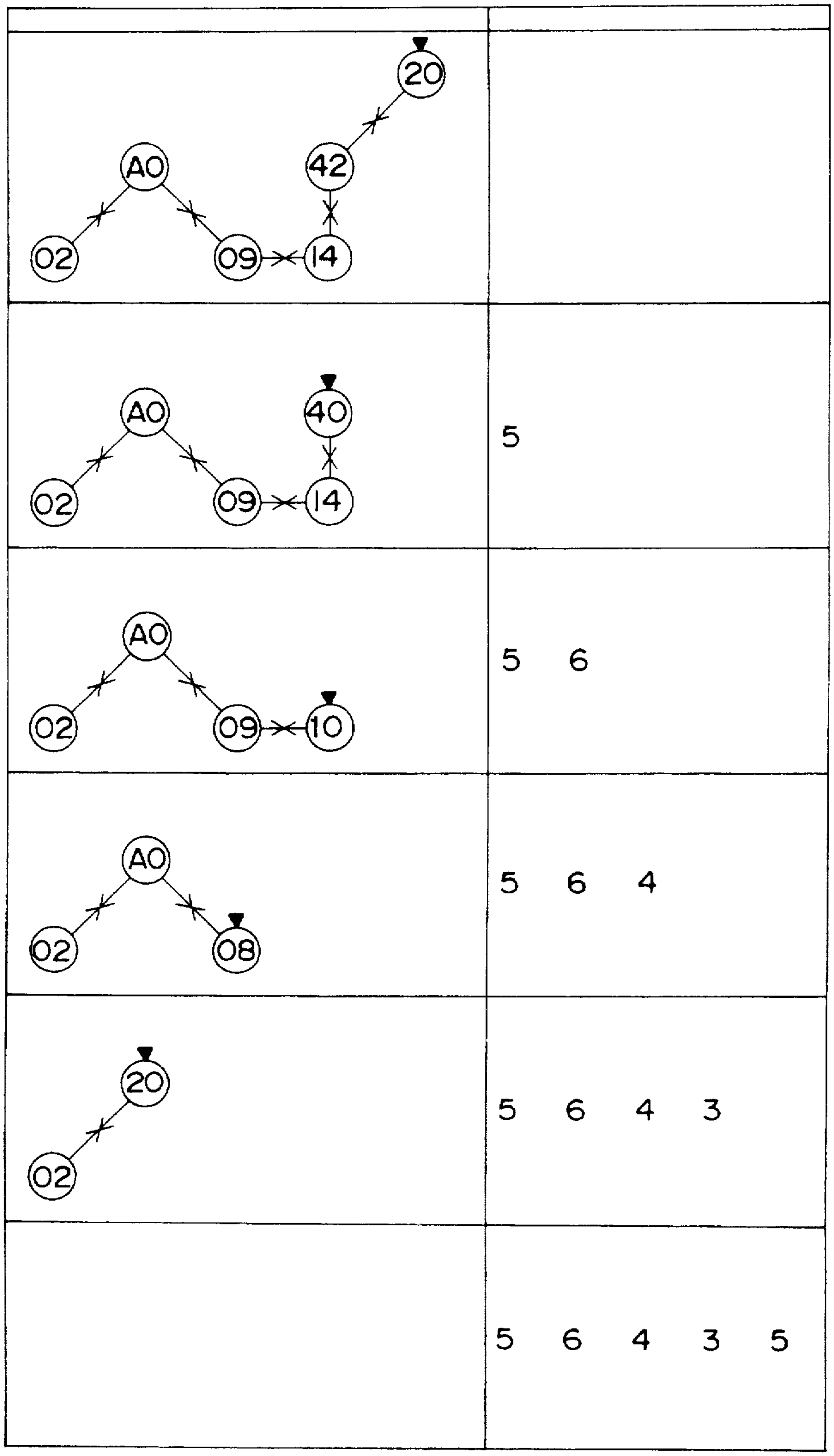
FIG. 37 is an operation view showing the conventional method of tracing a line.

FIGS. 17 through 20 show a gray image used in the inspection of the external appearance of the video head, a binary image, a line image formed in the first embodiment, and a line image processed in the first embodiment, respectively. More specifically, FIG. 17 shows the gray image of the front section of the video head. FIG. 18 shows the line image generated by thinning the binary image obtained by binarizing the gray image of FIG. 17. FIG. 19 shows the line image processed by the method of the first embodiment based on the image in FIG. 18. FIG. 20 shows an image formed by superimposing the line image of FIG. 17 and the processed image of FIG. 19 on each other. In FIGS. 17 and 18, the line image shown in FIG. 18 defectively has various kinds of lines such as a line which is connected to a line which should be disconnected from the line to make a long line or make a branch line, lines which should be connected to each other which are separated from each other, a line which is connected to an unnecessary short line, or a line which has a short line indicating noise. Therefore, it is impossible to make a decision as to which of the crack 40, the glass flaw 41, and the process flaw 42 of the video head 54 each line of the line image belongs to. But in FIGS. 17, 19, and 20, the image of FIG. 20 is formed by superimposing the line image of FIG. 17 and the processed image of FIG. 19 on each other, i.e., the lines of FIG. 17 are appropriately processed to form the image of FIG. 19. Accordingly, it is possible for each line of the processed line image to be determined as to which the line belongs to the crack 40, the glass flaw 41, and the process flaw 42 of the video head 54.

The method according to the present invention may be carried out in various aspects. For example, the coordinate axes, the direction code, and the length of noise to be erased can be designed according to purpose.

The number of data to be used in calculating the average direction for determining the tracing direction of a line and the method and place for storing traced image data obtained can also be designed.

Next, the second embodiment of the present invention will be described.

In the second embodiment, a fuzzy inference is applied to make a decision as to a cluster connection on the basis of a chain code and a distance between clusters, i.e. end points.

The process of retrieving lines connected at step #6 includes four steps in the second embodiment.

Figure 38B:
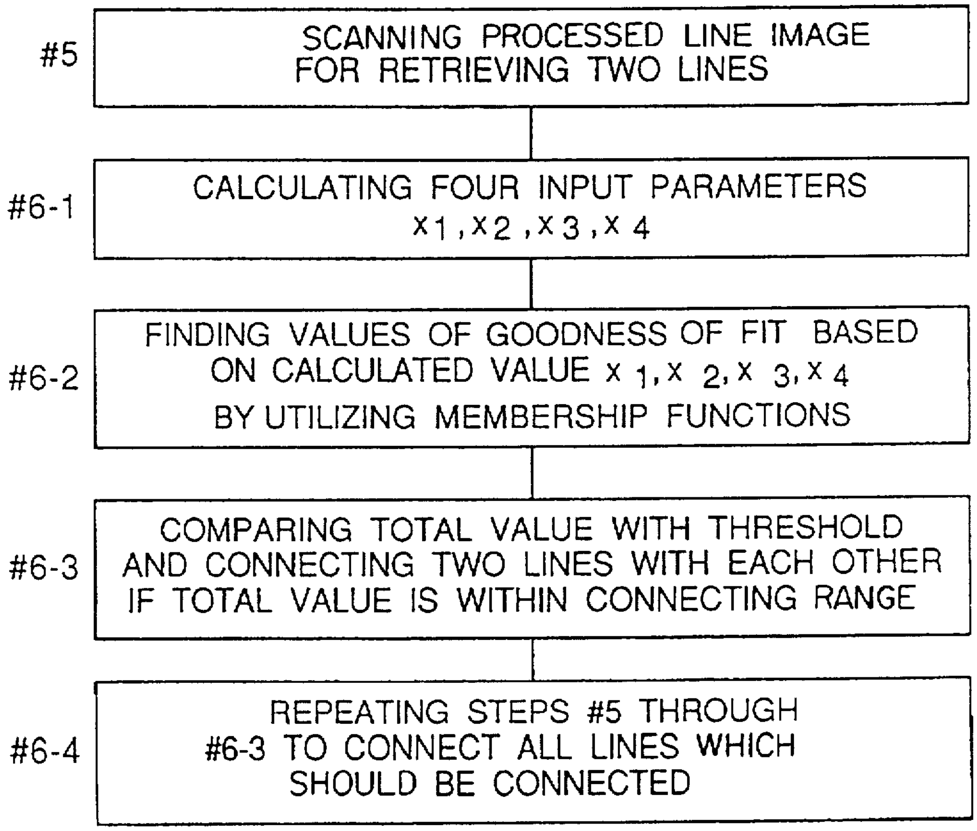
FIG. 38B is a flowchart showing a step wherein lines which must be connected to each other are retrieved and a step wherein the retrieved lines which must be connected to each other are connected to each other, and then the program terminates in accordance with the second embodiment.
Figure 38:
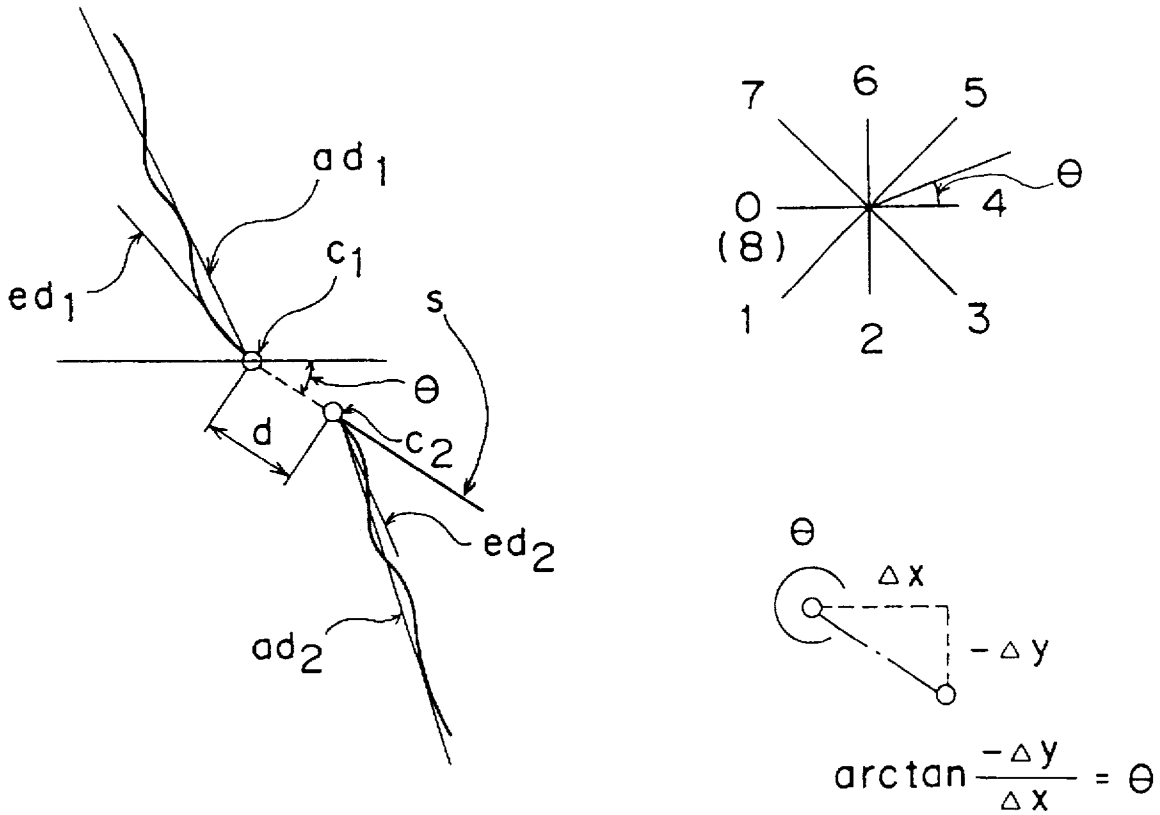
FIG. 38C is an explanatory view for a second embodiment of the present invention.

That is, after the shaped line image is scanned so as to retrieve two lines at step #5, as shown in FIG. 38B, at step #6-1, four input parameters $x_1$, $x_2$, $x_3$, $x_4$ are calculated. The four input parameters $x_1$, $x_2$, $x_3$, $x_4$ are used which are defined below and are similar to the parameters p1, p2, p3, p4 in the first embodiment:

- $x_1$: distance (d) between end points;
- $x_2$: difference |ed1–ed2| between average directions around end points;
- $x_3$: difference |ad1–ad2| between total average directions; and
- $x_4$: difference |ed–S| between a component (ed) of an average direction around an end point and a direction (S) between end points. The component (ed) is either a component (ed1) of an average direction around a cluster or a component (ed2) of an average direction around a cluster.

As shown in FIG. 38C, (ad1) denotes a total average direction of a cluster $C_1$, (ed1) denotes a component of an average direction around the cluster $C_1$, (S) denotes a direction between end points, (d) denotes a distance between the end points, (ed2) denotes a component of an average direction around the cluster $C_2$, and (ad2) denotes a total average direction of a cluster $C_2$.

At step #6-2, values of goodness of fit are found based on the calculated value $x_1$, $x_2$, $x_3$, $x_4$ by utilizing membership functions showing fuzzy rules.

At step #6-3, the total value is compared with a threshold, and then the two lines are connected to each other if the total value is within a connecting region with respect to the threshold. The connection decision is made according to, for example, seven rules and finally, a degree of connection possibility of 0–1.0, i.e. a total value of fit of goodness is outputted. Based on the result of this outputted decision, clusters are or are not connected to each other.

At step #6-4, the above steps #5, #6-1, #6-2, and #6-3 are repeated to connect all lines required to be connected.

For an example, the seven rules R1–R7 of the fuzzy theory are as follows:

Rule R1: IF $x_1$ is small and $x_2$ is small, THEN the end points are connected to each other.

Rule R2: IF $x_1$ is small and $x_3$ is small, THEN the end points are connected to each other.

Rule R3: IF $x_1$ is small and $x_4$ is small, THEN the end points are connected to each other.

Rule R4: IF $x_1$ is large, THEN the end points are not connected to each other.

Rule R5: IF $x_2$ is large, THEN the end points are not connected to each other.

Rule R6: IF $x_3$ is large, THEN the end points are not connected to each other.

Rule R7: IF $x_4$ is large, THEN the end points are not connected to each other.

These rules will be explained based on such an example that it is assumed that $x_1$=14, $x_2$=0.7, $x_3$=0.4, $x_4$=1.2.

Rule R1

Figure 39A:
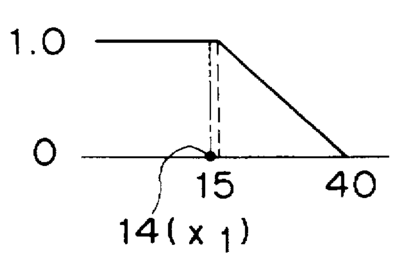
FIG. 39A is a graph of a membership function showing that $x_1$ is small.
Figure 39B:
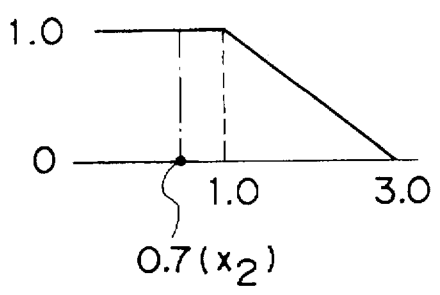
FIG. 39B is a graph of a membership function showing that $x_2$ is small.
Figure 39C:
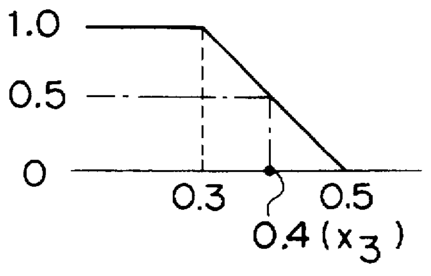
FIG. 39C is a graph of a membership function showing that $x_3$ is small.
Figure 39D:
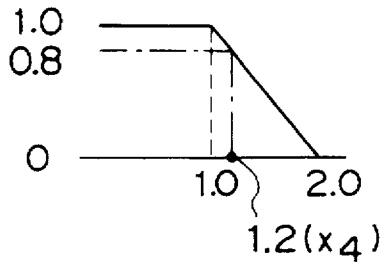
FIG. 39D is a graph of a membership function showing that $x_4$ is small.
Figure 39E:
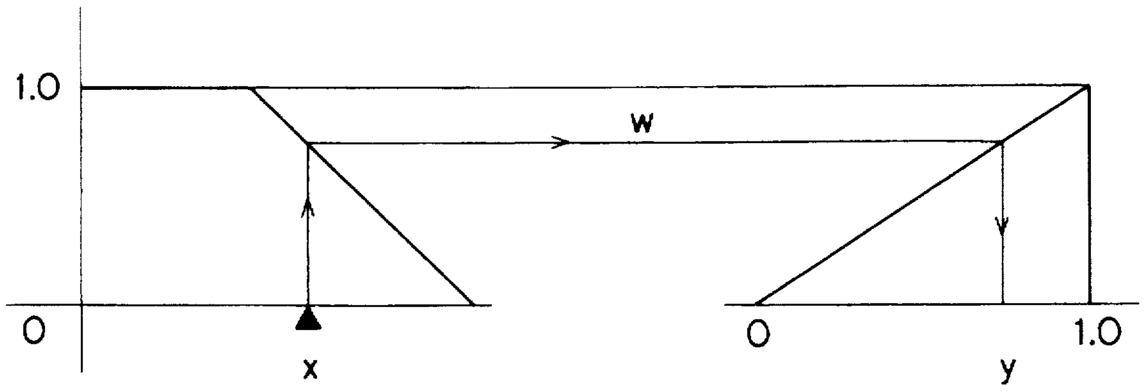
FIG. 39E is a graph showing the relationship between membership functions of a condition part and an action part, the relationship indicating that clusters (end points) are connected to each other.

FIG. 39A is a graph of a membership function showing that $x_1$ is small. In FIG. 39A, if $x_1$=14, $w_{11}$=1.0. FIG. 39B is a graph of a membership function showing that $x_2$ is small. In FIG. 39B, if $x_2$=0.7, $w_{12}$=1.0. Then, $w_1=w_{11}\times w_{12}=1.0\times 1.0=1.0$. FIG. 39E is a graph showing the relationship between membership functions of a condition part and an action part, the relationship indicating that clusters (end points) are connected to each other. According to FIG. 39E, if $w_1$=1.0, $y_1$=1.0.

Rule R2

According to FIG. 39A, if $x_1$=14, $w_{21}$=1.0. FIG. 39C is a graph of a membership function showing that $x_3$ is small. In FIG. 39C, if $x_3$=0.4, $w_{22}$=0.5. Then, $w_2=w_{21}\times w_{22}=1.0\times 0.5=0.5$. According to FIG. 39E, if $w_2$=0.5, $y_2$=0.5.

Rule R3

According to FIG. 39A, if $x_1$=14, $w_{31}$=1.0. FIG. 39D is a graph of a membership function showing that $x_4$ is small. In FIG. 39D, if $x_4$=1.2, $w_{32}$=0.8. Then, $w_3=w_{31}\times w_{32}=1.0\times 0.8=0.8$. According to FIG. 39E, if $w_3$=0.8, $y_3$=0.8.

Rule R4

Figure 40A:
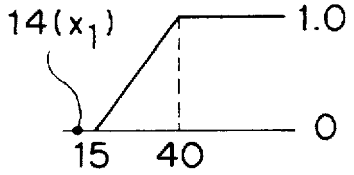
FIG. 40A is a graph of a membership function showing that $x_1$ is large.

FIG. 40A is a graph of a membership function showing that $x_1$ is large. In FIG. 40A, if $x_1$=14, $w_4=w_{41}$=0.0 FIG. 40E is a graph showing the relationship between membership functions of a condition part and an action part, the relationship indicating that clusters (end points) are not connected to each other. According to FIG. 40E, if $w_4$=0.0, $y_4$=1.0.

Rule R5

Figure 40B:
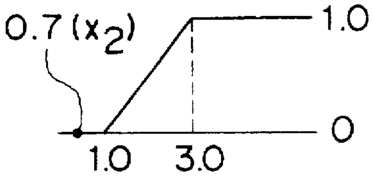
FIG. 40B is a graph of a membership function showing that $x_2$ is large.

FIG. 40B is a graph of a membership function showing that $x_2$ is large. In FIG. 40B, if $x_2$=0.7, $w_5=w_{51}$=0.9. According to FIG. 40E, if $w_5$=0.0, $y_5$=1.0.

Rule R6

Figure 40C:
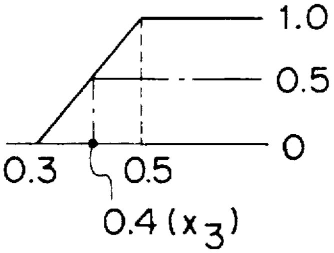
FIG. 40C is a graph of a membership function showing that $x_3$ is large.

FIG. 40C is a graph of a membership function showing that $x_3$ is large. In FIG. 40C, if $x_3$=0.4, $w_6=w_{61}$=0.5. According to FIG. 40E, if $w_6$=0.5, $y_6$=0.5.

Rule R7

Figure 40D:
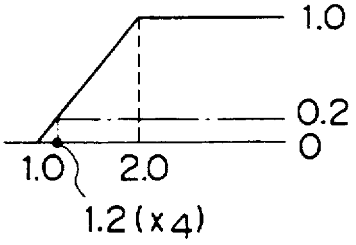
FIG. 40D is a graph of a membership function showing that $x_4$ is large.
Figure 40E:
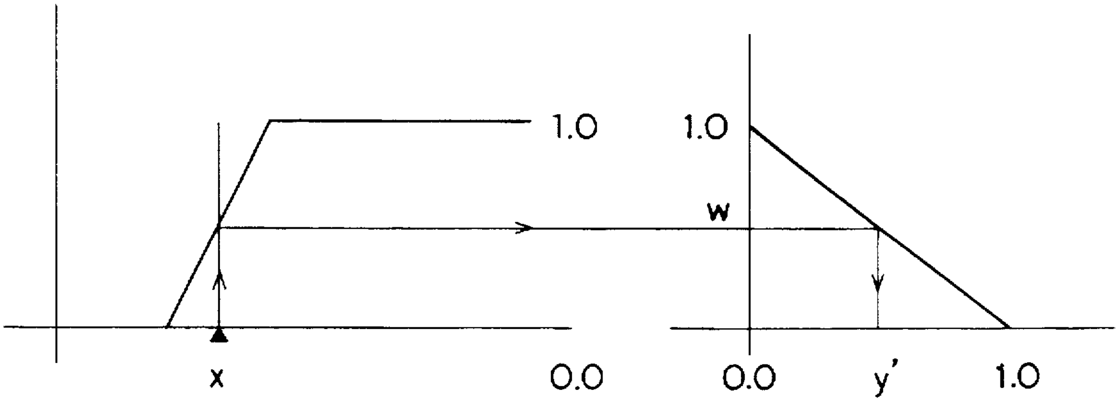
FIG. 40E is a graph showing the relationship between membership functions of a condition part and an action part, the relationship indicating that clusters (end points) are not connected to each other.

FIG. 40D is a graph of a membership function showing that $x_4$ is large. In FIG. 40D, if $x_4$=1.2, $w_7=w_{71}$=0.2. According to FIG. 40E, if $w_7$=0.2, $y_7$=0.8.

Based on the calculated results of the Rules R1–R7, y° is found by the following equation.

$$y^\circ = \frac{w_1\times y_1 + w_2\times y_2 + w_3\times y_3 + \ldots + w_7\times y_7}{w_1 + w_2 + w_3 + \ldots + w_7}$$

In the equation, supposing that threshold value is 0.7, if y°>0.7, then clusters are connected to each other. Then, the equation is as follows by substituting the calculated values.

$$\begin{aligned} y^\circ &= (1.0\times 1.0 + 0.5\times 0.5 + 0.8\times 0.8 + 0.0\times 1.0 + \\ &\quad 0.0\times 1.0 + 0.5\times 0.5 + 0.2\times 0.8)/ \\ &\quad (1.0 + 0.5 + 0.8 + 0.0 + 0.0 + 0.5 + 0.2) \\ &= 2.3/3.0 \\ &= 0.76 \end{aligned}$$

Therefore, 0.76>0.7, that is, the found value is larger than the threshold, and then the clusters are connected to each other.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A line image processing method for processing an image in which the following defective line or lines exist in a line image to be processed: a line which is connected to another line to make a long line or make a branch line and which should be disconnected therefrom, lines which should be connected to each other and which are separated from each other, a line which is connected to another line which is an unnecessary short line, or a line which is connected to an unnecessary short line which is due to noise, comprising the steps of:

receiving a line image to be processed by an image pick-up device;

scanning the line image to retrieve a line to be traced, the line having a width of one pixel;

tracing a line direction for each pixel composing the retrieved line by means of a direction code;

tracing the retrieved and traced line to an end point thereof by selecting at a branch point a direction code closer to an average value of a plurality of various direction codes disposed at points preceding the branch point when the branch point is detected;

storing image data of a cluster and erasing an image of the cluster corresponding to the line traced to the end point thereof from the line image to be processed;

transferring the stored image data of the cluster to form a processed line image; and tracing all lines by repeating the above steps starting from the scanning step;

further comprising, after the step of transferring the image data of the cluster, the steps of:

scanning the processed line image so as to retrieve each pair of lines which have end points which are close and opposed to each other;

calculating $x_1$ indicating a distance between end points of each pair of lines, and $x_2$ indicating an angular difference (|ed1−ed2|) between average angular directions of each pair of lines around the end points thereof;

finding values of goodness of fit based on the calculated values $x_1$ and $x_2$ by utilizing membership functions showing a first fuzzy rule that IF $x_1$ is small and $x_2$ is small, THEN the end points are connected to each other and a second fuzzy rule that IF $x_1$ or $x_2$ is large, THEN the end points are not connected to each other, and then finding a total value of goodness of fit in the vicinity of the end points of the retrieved pairs of lines;

comparing the total value with a threshold and then connecting the retrieved pairs of lines to each other if the total value is within a predetermined range with respect to the threshold; and repeating the above steps to connect all the pairs of lines which should be connected.

2. The line image processing method as claimed in claim 1, wherein the cluster to be transferred to the processed line image is longer than a predetermined length.

3. The line image processing method as claimed in claim 1, wherein a cluster which is shorter than a predetermined length is erased from the processed line image.

4. The line image processing method as claimed in claim 1, further comprising, after the step of transferring the generated image data of the cluster, the steps of:

scanning the processed line image so as to retrieve each pair of lines which have end points which are close and opposed to each other;

calculating positional coordinate data of each cluster to evaluate a position, direction, and a configuration in the vicinity of the end points of each retrieved pair of lines;

connecting the retrieved pair of lines to each other if the calculated positional coordinate data is within a predetermined range; and repeating the above steps to connect all pairs of lines which should be connected.

5. The line image processing method as claimed in claim 2, further comprising, after the step of transferring the image data of the cluster, the steps of:

scanning the processed line image so as to retrieve each pair of lines which have end points which are close and opposed to each other;

calculating positional coordinate data of each cluster to evaluate a position, direction, and a configuration in the vicinity of the end points of each retrieved pairs of lines;

connecting the retrieved pairs of lines to each other if the calculated positional coordinate data is within a predetermined range; and repeating the above steps to connect all pairs of lines which should be connected.

6. The line image processing method as claimed in claim 3, further comprising, after the step of transferring the image data of the cluster, the steps of:

scanning the processed line image so as to retrieve each pair of lines which have end points which are close and opposed to each other;

calculating positional coordinate data of each cluster to evaluate a position, direction, and a configuration in the vicinity of the end points of each retrieved pairs of lines;

connecting the retrieved pairs of lines to each other if the calculated positional coordinate data is within a predetermined range; and repeating the above steps to connect all pairs of lines which should be connected.

7. The line image processing method as claimed in claim 1, wherein the calculating step includes a step of calculating $x_3$ indicating a difference (|ad1−ad2|) between total average directions and $x_4$ indicating a difference (|ed−S2|) between a component (ed) of an average direction of a line around the end point thereof and a direction (S) between the end points thereof, and the finding step includes a step of finding values of goodness of fit based on the calculated values $x_3$ and $x_4$ by utilizing membership functions showing a third fuzzy rule that IF $x_1$ is small and $x_3$ or $x_4$ is small, THEN the end points are connected to each other and a fourth fuzzy rule that $x_3$ or $x_4$ is large, THEN the end pints are not connected to each other, and then finding a total value of goodness of fit as a whole in the vicinity of the end points of the retrieved pairs of lines.

* * * * *